United States Patent
Kang et al.

(10) Patent No.: US 12,430,973 B2
(45) Date of Patent: Sep. 30, 2025

(54) VEHICLE CONTROL METHOD, COMMUNICATIONS APPARATUS, AND COMPUTER-READABLE STORAGE MEDIUM

(71) Applicant: SHENZHEN YINWANG INTELLIGENT TECHNOLOGIES CO., LTD., Shenzhen (CN)

(72) Inventors: Xin Kang, Singapore (SG); Haiguang Wang, Singapore (SG); Zhuo Wei, Singapore (SG); Zhongding Lei, Singapore (SG)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 266 days.

(21) Appl. No.: 17/946,490

(22) Filed: Sep. 16, 2022

(65) Prior Publication Data
US 2023/0017001 A1    Jan. 19, 2023

Related U.S. Application Data

(63) Continuation of application No. PCT/CN2020/079592, filed on Mar. 17, 2020.

(51) Int. Cl.
*G07C 9/26*    (2020.01)
*G07C 9/00*    (2020.01)

(52) U.S. Cl.
CPC ........... *G07C 9/26* (2020.01); *G07C 9/00309* (2013.01)

(58) Field of Classification Search
CPC .. G07C 9/26; G07C 9/00309; G07C 9/00563; B60R 25/25; B60R 25/252; B60R 25/255; B60R 25/257; H04L 63/0861; H04W 4/40
See application file for complete search history.

(56) References Cited

U.S. PATENT DOCUMENTS

| | | | |
|---|---|---|---|
| 10,395,454 | B2 | 8/2019 | Nam et al. |
| 2015/0363986 | A1 | 12/2015 | Hoyos et al. |
| 2019/0031144 | A1* | 1/2019 | Gat .................. B60R 25/25 |
| 2019/0066412 | A1 | 2/2019 | Nam et al. |
| 2019/0371104 | A1* | 12/2019 | Suleiman ............ G06F 21/10 |

(Continued)

FOREIGN PATENT DOCUMENTS

| | | |
|---|---|---|
| CN | 104639323 A | 5/2015 |
| CN | 104786991 A | 7/2015 |

(Continued)

OTHER PUBLICATIONS

Extended European Search Report in European Appln No. 20925830.0, dated Jan. 20, 2023, 10 pages.

(Continued)

*Primary Examiner* — Lesa M Kennedy
(74) *Attorney, Agent, or Firm* — Fish & Richardson P.C.

(57) ABSTRACT

This disclosure provide a vehicle control method. A first terminal device obtains first biometric information of a first user, generates a first key based on the first biometric information and identifier information of the first terminal device, and generates first verification information based on the first key. Further, the first terminal device sends the first verification information to an in-vehicle device. When successfully verifying the first verification information, the in-vehicle device controls a vehicle to start.

18 Claims, 16 Drawing Sheets

(56) References Cited

U.S. PATENT DOCUMENTS

| | | | |
|---|---|---|---|
| 2020/0007338 A1* | 1/2020 | Oh | H04L 9/0866 |
| 2020/0118373 A1* | 4/2020 | Stitt | H01Q 1/3275 |
| 2020/0223396 A1* | 7/2020 | Yi | B60R 25/255 |
| 2022/0052997 A1* | 2/2022 | Kim | H04L 9/3231 |

FOREIGN PATENT DOCUMENTS

| | | | | |
|---|---|---|---|---|
| CN | 105187442 A | | 12/2015 | |
| CN | 106792440 A | | 5/2017 | |
| CN | 107665523 A | | 2/2018 | |
| CN | 107689098 A | | 2/2018 | |
| CN | 109017676 A | | 12/2018 | |
| CN | 109109814 A | | 1/2019 | |
| CN | 109492370 A | | 3/2019 | |
| CN | 109600343 A | | 4/2019 | |
| CN | 109600347 A | | 4/2019 | |
| CN | 109951277 A | | 6/2019 | |
| CN | 109969129 A | | 7/2019 | |
| CN | 110065470 A | | 7/2019 | |
| CN | 110182171 A | | 8/2019 | |
| CN | 110290525 A | | 9/2019 | |
| DE | 102014019250 A1 | * | 6/2016 | B60R 25/25 |
| JP | 2009286343 A | * | 12/2009 | |
| WO | 2018040643 A1 | | 3/2018 | |
| WO | 2018098886 A1 | | 6/2018 | |
| WO | WO-2019114578 A1 | * | 6/2019 | B60R 25/24 |

OTHER PUBLICATIONS

Chen et al., "Automobile Anti-Theft System Based on Mobile Phone-Electronic Key Fingerprint Identification Technology," Guizhou University, Aug. 15, 2016, 6 pages (with an English abstract).

Office Action in Chinese Appln. No. 202080004576.9, dated Sep. 28, 2021, 7 pages (with English translation).

Office Action in Chinese Appln. No. 202080004576.9, dated Jun. 24, 2021, 34 pages (with English translation).

International Search Report and Written Opinion in International Appln. No. PCT/CN2020/079592, mailed on Dec. 16, 2020, 13 pages (with English translation).

* cited by examiner

VEHICLE CONTROL METHOD, COMMUNICATIONS APPARATUS, AND COMPUTER-READABLE STORAGE MEDIUM

CROSS-REFERENCE TO RELATED APPLICATIONS

This is a continuation of International Patent Application No. PCT/CN2020/079592, filed on Mar. 17, 2020, the disclosure of which is hereby incorporated by reference in its entirety.

TECHNICAL FIELD

This disclosure relates to the field of communications technologies, and in particular, to a vehicle control method, a communications apparatus, and a computer-readable storage medium.

BACKGROUND

With the development of society, a vehicle has become an indispensable means of transportation in people's daily life. When using a vehicle, a user uses a vehicle key to control a vehicle door to open or close, control an engine to start or stop, and the like.

With the development of science and technology, the vehicle key is constantly updated. For example, the vehicle key evolves from a physical vehicle key to a digital vehicle key based on a terminal device. However, both the physical vehicle key and the digital vehicle key have a security problem. For example, a physical vehicle key is easily lost or cannot be found. Once the terminal device for a digital vehicle key is lost, anyone who obtains the terminal device can easily open the vehicle door and control the vehicle, resulting in low vehicle security.

SUMMARY

This disclosure provides a vehicle control method, a communications apparatus, and a computer-readable storage medium, to improve vehicle security.

According to a first aspect, this disclosure provides a vehicle control method. The method includes: A first terminal device obtains first biometric information of a first user collected by a first collection module, generates a first key based on the first biometric information and identifier information of the first terminal device, further generates to-be-verified first verification information based on the first key, and sends the first verification information to an in-vehicle device, where the in-vehicle device verifies the first verification information by using a preset digital vehicle key, and if the verification succeeds, controls a vehicle to start. According to the solution provided in this embodiment, when verifying the first verification information, the in-vehicle device needs to perform authentication on both the first terminal device and the first biometric information of the first user. In other words, if the first user loses the first terminal device, an unauthorized user that obtains the first terminal device cannot control the vehicle based on only the identifier information of the first terminal device, and the first terminal device further needs to collect biometric information of the unauthorized user. Because different users have different biometric information, a key generated by the first terminal device based on the biometric information of the unauthorized user and the identifier information of the first terminal device is different from the first key. When the first terminal device sends, to the in-vehicle device, verification information generated by the first terminal device based on the key, the in-vehicle device cannot successfully verify the verification information, and the in-vehicle device cannot control the vehicle to start. This improves vehicle security.

In a possible design, the first collection module includes a biometric information collection module.

In a possible design, when generating the first key based on the first biometric information and the identifier information of the first terminal device, the first terminal device may specifically generate a first-part key based on the first biometric information; generate a second-part key based on the identifier information of the first terminal device; and further generate the first key based on the first-part key and the second-part key.

In a possible design, the digital vehicle key is obtained based on the first biometric information of the first user and the identifier information of the first terminal device.

In a possible design, before the first terminal device obtains the first biometric information of the first user collected by the first collection module, the method further includes: The first terminal device obtains the first biometric information of the first user collected by the first collection module. The first terminal device generates the digital vehicle key based on the first biometric information and the identifier information of the first terminal device. The first terminal device sends the digital vehicle key to the in-vehicle device. According to the solution provided in this embodiment, the in-vehicle device can obtain the digital vehicle key in advance when the vehicle is delivered from a factory or before the first user uses the vehicle.

In a possible design, after the first terminal device sends the digital vehicle key to the in-vehicle device, and/or after the first terminal device sends the first verification information to the in-vehicle device, the first terminal device may further delete the first biometric information and the first key. The solution provided in this embodiment can prevent the first biometric information of the vehicle owner from being stored in the first terminal device and the in-vehicle device, and reduce a risk of leaking the first biometric information of the vehicle owner.

In a possible design, that the first terminal device generates the to-be-verified first verification information based on the first key includes: The first terminal device generates the to-be-verified first verification information based on the first key and at least one of identifier information of the vehicle, random information generated by the in-vehicle device, and first permission information, where the first permission information is permission information generated by the first terminal device for the first user to control the vehicle. The first permission information provided in this embodiment can be used to limit control permission of the first user on the vehicle, and this improves vehicle security.

In a possible design, before the first terminal device generates the to-be-verified first verification information based on the first key, the method further includes: The first terminal device obtains the identifier information of the vehicle from the in-vehicle device and/or the random information generated by the in-vehicle device.

In a possible design, that the first terminal device generates the to-be-verified first verification information based on the first key and the at least one of the identifier information of the vehicle, the random information generated by the in-vehicle device, and the first permission information includes: The first terminal device generates the to-beverified first verification information based on the first key and the first permission information. That the first terminal device sends the first verification information to the in-vehicle device includes: The first terminal device sends the first verification information and the first permission information to the in-vehicle device. According to the solution provided in this embodiment, the control permission of the first user on the vehicle can be limited to improve vehicle security. In addition, the in-vehicle device can verify the first verification information based on the first permission information and the digital vehicle key.

In a possible design, the digital vehicle key is an asymmetric key of the first key; and that the first terminal device generates the to-be-verified first verification information based on the first key and the at least one of the identifier information of the vehicle, the random information generated by the in-vehicle device, and the first permission information includes: The first terminal device signs the at least one of the identifier information of the vehicle, the random information generated by the in-vehicle device, and the first permission information based on the first key, to obtain the to-be-verified first verification information.

In a possible design, when the digital vehicle key is a symmetric key of the first key, that the first terminal device generates the to-be-verified first verification information based on the first key and the at least one of the identifier information of the vehicle, the random information generated by the in-vehicle device, and the first permission information includes: The first terminal device generates the to-be-verified first verification information based on HMAC (K, M), where K represents the first key, and M represents the at least one of the identifier information of the vehicle, the random information generated by the in-vehicle device, and the first permission information.

In a possible design, the first terminal device may further obtain a second key from a second terminal device of a second user, where the second key is generated based on second biometric information of the second user and identifier information of the second terminal device. The first terminal device generates authorization information based on the first key and the second key. The first terminal device sends the authorization information to the second terminal device, where the authorization information is used by the second terminal device to generate to-be-verified second verification information, and the second verification information is sent to the in-vehicle device to perform identity authentication on the second terminal device. According to the solution provided in this embodiment, the first user can authorize, on the first terminal device, the second user to use the vehicle. Compared with a solution in which the second user needs to obtain a physical vehicle key from the first user, and after using the vehicle, the second user needs to return the physical vehicle key to the first user, this solution improves flexibility and convenience of a vehicle rental service. In addition, in a process in which the first user authorizes, on the first terminal device, the second user to use the vehicle, the first terminal device communicates with the second terminal device, and the first terminal device does not need to configure on the in-vehicle device. This further improves convenience of the vehicle rental service.

In a possible design, the second key is sent to the in-vehicle device, and the digital vehicle key and the second key are used by the in-vehicle device to perform identity authentication on the second terminal device.

In a possible design, when the digital vehicle key is a symmetric key of the first key, the authorization information includes a third key, and the third key is generated based on the first key and the second key. When the digital vehicle key is an asymmetric key of the first key, the authorization information includes signature information, the signature information is information obtained by signing at least one of second permission information and the second key based on the first key, the second permission information includes the second key, and the second permission information is permission information that is used for the second user to control the vehicle and is generated by the first terminal device based on the second key after the first terminal device receives the second key from the second terminal device. According to the solution provided in this embodiment, the first user can limit permission of the second user for using the vehicle. This further improves vehicle security and flexibility of the vehicle rental service.

In a possible design, when the digital vehicle key is the symmetric key of the first key, that the first terminal device sends the authorization information to the second terminal device includes: The first terminal device sends the authorization information and first encryption information to the second terminal device, where the first encryption information is information obtained by encrypting the second permission information based on the first key.

In a possible design, when the digital vehicle key is the asymmetric key of the first key, that the first terminal device sends the authorization information to the second terminal device includes: The first terminal device sends the authorization information and second encryption information to the second terminal device, where the second encryption information is information obtained by encrypting the second permission information based on a public key of the vehicle.

In a possible design, the in-vehicle device obtains the second key from the first terminal device.

According to a second aspect, this disclosure provides a vehicle control method. The method includes: An in-vehicle device obtains to-be-verified first verification information from a first terminal device, where the first verification information is generated by the first terminal device based on a first key, and the first key is generated by the first terminal device based on first biometric information of a first user and identifier information of the first terminal device. The in-vehicle device verifies the first verification information by using a preset digital vehicle key, and if the verification succeeds, controls a vehicle to start, where the digital vehicle key is obtained based on the first biometric information of the first user and the identifier information of the first terminal device. According to the solution provided in this embodiment, w % ben verifying the first verification information, the in-vehicle device needs to perform authentication on both the first terminal device and the first biometric information of the first user. In other words, if the first user loses the first terminal device, an unauthorized user that obtains the first terminal device cannot control the vehicle based on only the identifier information of the first terminal device, and the first terminal device further needs to collect biometric information of the unauthorized user. Because different users have different biometric information, a key generated by the first terminal device based on the biometric information of the unauthorized user and the identifier information of the first terminal device is different from the first key. When the first terminal device sends, to the in-vehicle device, verification information generated by the first terminal device based on the key, the in-vehicle device cannot successfully verify the verification information, and the in-vehicle device cannot control the vehicle to start. This improves vehicle security.

In a possible design, the in-vehicle device may further obtain second verification information and third verification information from a second terminal device of a second user, where the second verification information is generated based on authorization information that is received by the second terminal device from the first terminal device, the third verification information is generated based on a second key, and the second key is generated based on second biometric information of the second user and identifier information of the second terminal device. The in-vehicle device verifies the second verification information and the third verification information, and if the verification succeeds, controls the vehicle to start. According to the solution provided in this embodiment, the first user can authorize, on the first terminal device, the second user to use the vehicle. Compared with a solution in which the second user needs to obtain a physical vehicle key from the first user, and after using the vehicle, the second user needs to return the physical vehicle key to the first user, this solution improves flexibility and convenience of a vehicle rental service. In addition, in a process in which the first user authorizes, on the first terminal device, the second user to use the vehicle, the first terminal device communicates with the second terminal device, and the first terminal device does not need to configure on the in-vehicle device. This further improves convenience of the vehicle rental service.

According to a third aspect, this disclosure provides a vehicle control method. The method includes: A second terminal device obtains second biometric information of a second user collected by a second collection module. The second terminal device generates a second key based on the second biometric information and identifier information of the second terminal device. The second terminal device sends the second key to a first terminal device of a first user. The second terminal device obtains authorization information from the first terminal device, where the authorization information is generated based on a first key and the second key, and the first key is generated based on first biometric information of the first user and identifier information of the first terminal device. The second terminal device generates to-be-verified second verification information based on the authorization information, and generates to-be-verified third verification information based on the second key. The second terminal device sends the second verification information and the third verification information to an in-vehicle device, where the in-vehicle device is configured to: receive the second key, verify the third verification information based on the second key, verify the second verification information based on a preset digital vehicle key and the second key, and if the verification succeeds, control a vehicle to start, and the digital vehicle key is obtained based on the first biometric information of the first user and the identifier information of the first terminal device. According to the solution provided in this embodiment, the first user can authorize, on the first terminal device, the second user to use the vehicle. Compared with a solution in which the second user needs to obtain a physical vehicle key from the first user, and after using the vehicle, the second user needs to return the physical vehicle key to the first user, this solution improves flexibility and convenience of a vehicle rental service. In addition, in a process in which the first user authorizes, on the first terminal device, the second user to use the vehicle, the first terminal device communicates with the second terminal device, and the first terminal device does not need to configure on the in-vehicle device. This further improves convenience of the vehicle rental service.

In a possible design, the second collection module includes a biometric information collection module.

In a possible design, when the digital vehicle key is a symmetric key of the first key, the authorization information includes a third key, and the third key is generated based on the first key and the second key.

In a possible design, when the digital vehicle key is an asymmetric key of the first key, the authorization information includes signature information, the signature information is information obtained by signing at least one of second permission information and the second key based on the first key, the second permission information includes the second key, and the second permission information is permission information that is used for the second user to control the vehicle and is generated by the first terminal device based on the second key after the first terminal device receives the second key from the second terminal device. According to the solution provided in this embodiment, the first user can limit permission of the second user for using the vehicle. This further improves vehicle security and flexibility of the vehicle rental service.

In a possible design, when the digital vehicle key is the symmetric key of the first key, that the second terminal device receives the authorization information from the first terminal device includes: The second terminal device receives the authorization information and first encryption information from the first terminal device, where the first encryption information is information obtained by encrypting the second permission information based on the first key.

In a possible design, when the digital vehicle key is the asymmetric key of the first key, that the second terminal device receives the authorization information from the first terminal device includes: The second terminal device receives the authorization information and second encryption information from the first terminal device, where the second encryption information is information obtained by encrypting the second permission information based on a public key of the vehicle.

According to a fourth aspect, this disclosure provides a vehicle control method. The method includes: An in-vehicle device obtains second verification information and third verification information from a second terminal device of a second user, where the second verification information is generated based on authorization information that is received by the second terminal device from a first terminal device of a first user, the third verification information is generated based on a second key, the authorization information is generated based on a first key and the second key, the first key is generated based on first biometric information of the first user and identifier information of the first terminal device, and the second key is generated based on second biometric information of the second user and identifier information of the second terminal device. The in-vehicle device obtains the second key. The in-vehicle device verifies the third verification information based on the second key, verifies the second verification information based on a preset digital vehicle key and the second key, and if the verification succeeds, controls a vehicle to start, where the digital vehicle key is obtained based on the first biometric information of the first user and the identifier information of the first terminal device. According to the solution provided in this embodiment, the first user can authorize, on the first terminal device, the second user to use the vehicle. Compared with a solution in which the second user needs to obtain a physical vehicle key from the first user, and after using the vehicle, the second user needs to return the physical vehicle key to the first user, this solution improves flexibility and convenience of a vehicle rental service. In addition, in a process in which the first user authorizes, on the first terminal device, the second user to use the vehicle, the first terminal device communicates with the second terminal device, and the first terminal device does not need to configure on the in-vehicle device. This further improves convenience of the vehicle rental service.

In a possible design, when the digital vehicle key is a symmetric key of the first key, the authorization information includes a third key, and the third key is generated based on the first key and the second key.

In a possible design, when the digital vehicle key is an asymmetric key of the first key, the authorization information includes signature information, the signature information is information obtained by signing at least one of second permission information and the second key based on the first key, the second permission information includes the second key, and the second permission information is permission information that is used for the second user to control the vehicle and is generated by the first terminal device based on the second key after the first terminal device receives the second key from the second terminal device. According to the solution provided in this embodiment, the first user can limit permission of the second user for using the vehicle. This further improves vehicle security and flexibility of the vehicle rental service.

In a possible design, that the in-vehicle device obtains the second key includes: The in-vehicle device obtains the second key from the first terminal device.

In a possible design, that the in-vehicle device obtains the second key includes: The in-vehicle device obtains first encryption information from the second terminal device, where the first encryption information is information obtained by encrypting second permission information based on the first key, and the second permission information includes the second key. According to the solution provided in this embodiment, the second terminal device can send the second key to the in-vehicle device by using the first encryption information, so that the in-vehicle device can verify the third verification information based on the second key.

In a possible design, that the in-vehicle device obtains the second key includes: The in-vehicle device obtains second encryption information from the second terminal device, where the second encryption information is information obtained by encrypting the second permission information based on a public key of the vehicle. According to the solution provided in this embodiment, the second terminal device can send the second key to the in-vehicle device by using the second encryption information, so that the in-vehicle device can verify the third verification information based on the second key.

According to a fifth aspect, this disclosure provides a communications apparatus, including:

an obtaining module, configured to obtain first biometric information of a first user collected by a first collection module;

a generation module, configured to: generate a first key based on the first biometric information and identifier information of a first terminal device; and generate to-be-verified first verification information based on the first key; and a sending module, configured to send the first verification information to an in-vehicle device, where the in-vehicle device is configured to: verify the first verification information by using a preset digital vehicle key, and if the verification succeeds, control a vehicle to start.

In a possible design, the first collection module includes a biometric information collection module.

In a possible design, when generating the first key based on the first biometric information and the identifier information of the first terminal device, the generation module is specifically configured to: generate a first-part key based on the first biometric information; generate a second-part key based on the identifier information of the first terminal device; and generate the first key based on the first-part key and the second-part key.

In a possible design, the digital vehicle key is obtained based on the first biometric information of the first user and the identifier information of the first terminal device.

In a possible design, before the obtaining module obtains the first biometric information of the first user collected by the first collection module, the obtaining module is further configured to obtain the first biometric information of the first user collected by the first collection module. The generation module is further configured to generate the digital vehicle key based on the first biometric information and the identifier information of the first terminal device. The sending module is further configured to send the digital vehicle key to the in-vehicle device.

In a possible design, the communications apparatus further includes a deletion module. After the sending module sends the digital vehicle key to the in-vehicle device, and/or after the sending module sends the first verification information to the in-vehicle device, the deletion module is configured to delete the first biometric information and the first key.

In a possible design, when generating the to-be-verified first verification information based on the first key, the generation module is specifically configured to: generate the to-be-verified first verification information based on the first key and at least one of identifier information of the vehicle, random information generated by the in-vehicle device, and first permission information, where the first permission information is permission information generated by the first terminal device for the first user to control the vehicle. The first permission information provided in this embodiment can be used to limit control permission of the first user on the vehicle, and this improves vehicle security.

In a possible design, the communications apparatus further includes a receiving module. Before the generation module generates the to-be-verified first verification information based on the first key, the receiving module is configured to receive the identifier information of the vehicle from the in-vehicle device and/or the random information generated by the in-vehicle device.

In a possible design, when generating the to-be-verified first verification information based on the first key and the at least one of the identifier information of the vehicle, the random information generated by the in-vehicle device, and the first permission information, the generation module is specifically configured to generate the to-be-verified first verification information based on the first key and the first permission information. When sending the first verification information to the in-vehicle device, the sending module is specifically configured to send the first verification information and the first permission information to the in-vehicle device.

In a possible design, the digital vehicle key is an asymmetric key of the first key, and when generating the to-be-verified first verification information based on the first key and the at least one of the identifier information of the vehicle, the random information generated by the in-vehicle device, and the first permission information, the generation module is specifically configured to sign the at least one of the identifier information of the vehicle, the random information generated by the in-vehicle device, and the first permission information based on the first key, to obtain the to-be-verified first verification information.

In a possible design, when the digital vehicle key is a symmetric key of the first key, when generating the to-be-verified first verification information based on the first key and the at least one of the identifier information of the vehicle, the random information generated by the in-vehicle device, and the first permission information, the generation module is specifically configured to generate the to-be-verified first verification information based on HMAC (K, M), where K represents the first key, and M represents the at least one of the identifier information of the vehicle, the random information generated by the in-vehicle device, and the first permission information.

In a possible design, the receiving module is further configured to receive a second key from a second terminal device of a second user, where the second key is generated based on second biometric information of the second user and identifier information of the second terminal device. The generation module is further configured to generate authorization information based on the first key and the second key. The sending module is further configured to send the authorization information to the second terminal device, where the authorization information is used by the second terminal device to generate to-be-verified second verification information, and the second verification information is sent to the in-vehicle device to perform identity authentication on the second terminal device.

In a possible design, the second key is sent to the in-vehicle device, and the digital vehicle key and the second key are used by the in-vehicle device to perform identity authentication on the second terminal device.

In a possible design, when the digital vehicle key is a symmetric key of the first key, the authorization information includes a third key, and the third key is generated based on the first key and the second key; or when the digital vehicle key is an asymmetric key of the first key, the authorization information includes signature information, the signature information is information obtained by signing at least one of second permission information and the second key based on the first key, the second permission information includes the second key, and the second permission information is permission information that is used for the second user to control the vehicle and is generated by the first terminal device based on the second key after the first terminal device receives the second key from the second terminal device. According to the solution provided in this embodiment, the first user can limit permission of the second user for using the vehicle. This further improves vehicle security and flexibility of the vehicle rental service.

In a possible design, when the digital vehicle key is the symmetric key of the first key, when sending the authorization information to the second terminal device, the sending module is specifically configured to send the authorization information and first encryption information to the second terminal device, where the first encryption information is information obtained by encrypting the second permission information based on the first key.

In a possible design, when the digital vehicle key is the asymmetric key of the first key, when sending the authorization information to the second terminal device, the sending module is specifically configured to send the authorization information and second encryption information to the second terminal device, where the second encryption information is information obtained by encrypting the second permission information based on a public key of the vehicle.

In a possible design, the sending module is further configured to send the second key to the in-vehicle device.

According to a sixth aspect, this disclosure provides a communications apparatus, including:
a receiving module, configured to receive to-be-verified first verification information from a first terminal device, where the first verification information is generated by the first terminal device based on a first key, and the first key is generated by the first terminal device based on first biometric information of a first user and identifier information of the first terminal device;
a verification module, configured to verify the first verification information by using a preset digital vehicle key; and
a control module, configured to: if the verification module successfully verifies the first verification information, control a vehicle to start, where the digital vehicle key is obtained based on the first biometric information of the first user and the identifier information of the first terminal device.

In a possible design, the receiving module is further configured to: receive second verification information and third verification information from a second terminal device of a second user, where the second verification information is generated based on authorization information that is received by the second terminal device from the first terminal device, the third verification information is generated based on a second key, and the second key is generated based on second biometric information of the second user and identifier information of the second terminal device. The verification module is further configured to verify the second verification information and the third verification information. If the verification module successfully verifies the second verification information and third verification information, the control module controls the vehicle to start.

According to a seventh aspect, this disclosure provides a communications apparatus, including:
an obtaining module, configured to obtain second biometric information of a second user collected by a second collection module:
a generation module, configured to generate a second key based on the second biometric information and identifier information of the second terminal device:
a sending module, configured to send the second key to a first terminal device of a first user; and
a receiving module, configured to receive authorization information from the first terminal device, where the authorization information is generated based on a first key and the second key, and the first key is generated based on first biometric information of the first user and identifier information of the first terminal device; where
the generation module is further configured to: generate to-be-verified second verification information based on the authorization information, and generate to-be-verified third verification information based on the second key; and
the sending module is further configured to send the second verification information and the third verification information to an in-vehicle device, where the in-vehicle device is configured to: receive the second key, verify the third verification information based on the second key, verify, the second verification information based on a preset digital vehicle key and the second key, and if the verification succeeds, control a vehicle to start, and the digital vehicle key is obtained based on the first biometric information of the first user and the identifier information of the first terminal device.

In a possible design, the second collection module includes a biometric information collection module.

In a possible design, when the digital vehicle key is a symmetric key of the first key, the authorization information includes a third key, and the third key is generated based on the first key and the second key.

In a possible design, when the digital vehicle key is an asymmetric key of the first key, the authorization information includes signature information, the signature information is information obtained by signing at least one of second permission information and the second key based on the first key, the second permission information includes the second key, and the second permission information is permission information that is used for the second user to control the vehicle and is generated by the first terminal device based on the second key after the first terminal device receives the second key from the second terminal device.

In a possible design, when the digital vehicle key is the symmetric key of the first key, when receiving the authorization information from the first terminal device, the receiving module is specifically configured to receive the authorization information and first encryption information from the first terminal device, where the first encryption information is information obtained by encrypting the second permission information based on the first key.

In a possible design, when the digital vehicle key is the symmetric key of the first key, when receiving the authorization information from the first terminal device, the receiving module is specifically configured to receive the authorization information and second encryption information from the first terminal device, where the second encryption information is information obtained by encrypting the second permission information based on a public key of the vehicle.

According to an eighth aspect, this disclosure provides a communications apparatus, including:
- a receiving module, configured to: receive second verification information and third verification information from a second terminal device of a second user, where the second verification information is generated based on authorization information that is received by the second terminal device from a first terminal device of a first user, the third verification information is generated based on a second key, the authorization information is generated based on a first key and the second key, the first key is generated based on first biometric information of the first user and identifier information of the first terminal device, and the second key is generated based on second biometric information of the second user and identifier information of the second terminal device; and receive the second key;
- a verification module, configured to verify the third verification information based on the second key, and verify the second verification information based on a preset digital vehicle key and the second key; and
- a control module, configured to: if the verification module successfully verifies the second verification information and the third verification information, control a vehicle to start, where the digital vehicle key is obtained based on the first biometric information of the first user and the identifier information of the first terminal device.

In a possible design, when the digital vehicle key is a symmetric key of the first key, the authorization information includes a third key, and the third key is generated based on the first key and the second key.

In a possible design, when the digital vehicle key is an asymmetric key of the first key, the authorization information includes signature information, the signature information is information obtained by signing at least one of second permission information and the second key based on the first key, the second permission information includes the second key, and the second permission information is permission information that is used for the second user to control the vehicle and is generated by the first terminal device based on the second key after the first terminal device receives the second key from the second terminal device.

In a possible design, when receiving the second key, the receiving module is specifically configured to receive the second key from the first terminal device.

In a possible design, when receiving the second key, the receiving module is specifically configured to receive first encryption information from the second terminal device, where the first encryption information is information obtained by encrypting second permission information based on the first key, and the second permission information includes the second key.

In a possible design, when receiving the second key, the receiving module is specifically configured to receive second encryption information from the second terminal device, where the second encryption information is information obtained by encrypting the second permission information based on a public key of the vehicle.

According to a ninth aspect, this disclosure provides a communications apparatus, including an interface and a processor, where the interface is coupled to the processor.

The processor is configured to execute computer programs or instructions in a memory, so that the method according to the first aspect, the second aspect, the third aspect, or the fourth aspect is performed.

In a possible design, the communications apparatus in the ninth aspect may be a first terminal device, a second terminal device, or an in-vehicle device, or may be a chip. The interface and the processor may be integrated on a same chip, or may be separately disposed on different chips.

In a possible design, the communications apparatus in the ninth aspect may further include a memory, and the memory is configured to store the computer programs or instructions. The memory and the processor may be integrated on a same chip, or may be separately disposed on different chips.

According to a tenth aspect, this disclosure provides a communications apparatus, including a processor and a transceiver, where the processor and the transceiver communicate with each other through an internal connection.

The processor is configured to execute computer programs or instructions in a memory, so that the method according to the first aspect, the second aspect, the third aspect, or the fourth aspect is performed.

The transceiver is configured to perform receiving and sending steps in the method according to the first aspect, the second aspect, the third aspect, or the fourth aspect.

In a possible design, the communications apparatus in the tenth aspect may be a first terminal device, a second terminal device, or an in-vehicle device, or may be a component (for example, a chip or a circuit) of the first terminal device, the second terminal device, or the in-vehicle device.

According to an eleventh aspect, this disclosure provides a communications apparatus including a processor and a memory, where the processor is coupled to the memory.

The memory is configured to store computer programs or instructions.

The processor is configured to execute the computer programs or instructions stored in the memory, so that the communications apparatus performs the method according to the first aspect, the second aspect, the third aspect, or the fourth aspect.

According to a twelfth aspect, this disclosure provides a communications apparatus including a processor, a memory, and a transceiver.

The memory is configured to store computer programs or instructions.

The processor is configured to execute the computer programs or instructions stored in the memory, so that the communications apparatus performs the method according to the first aspect, the second aspect, the third aspect, or the fourth aspect.

According to a thirteenth aspect, this disclosure provides a communications apparatus including an input interface circuit, a logic circuit, and an output interface circuit. The input interface circuit is configured to obtain to-be-processed data; the logic circuit is configured to perform the method according to the first aspect, the second aspect, the third aspect, or the fourth aspect to process the to-be-processed data, to obtain processed data; and the output interface circuit is configured to output the processed data.

According to a fourteenth aspect, this disclosure provides a computer-readable storage medium including computer programs or instructions. When the computer programs or instructions are run on a computer, the method according to the first aspect, the second aspect, the third aspect, or the fourth aspect is performed.

According to a fifteenth aspect, this disclosure provides a computer program including programs or instructions. When the programs or instructions are run on a computer, the method according to the first aspect, the second aspect, the third aspect, or the fourth aspect is performed.

In a possible design, some or all of the computer programs in the fifteenth aspect may be stored in a storage medium encapsulated with the processor, or some or all may be stored in a memory not encapsulated with the processor.

According to a sixteenth aspect, this disclosure provides a computer program product. The computer program product includes computer programs or instructions, and when the computer programs or instructions are run on a computer, the method according to the first aspect, the second aspect, the third aspect, or the fourth aspect is performed.

According to a seventeenth aspect, an embodiment of this disclosure further provides a system, including the receiving apparatus and the sending apparatus according to the first aspect, the second aspect, the third aspect, or the fourth aspect.

According to an eighteenth aspect, an embodiment of this disclosure further provides a processor. The processor includes at least one circuit, configured to perform the method according to the first aspect, the second aspect, the third aspect, or the fourth aspect.

It can be learned from the foregoing aspects, the first terminal device collects the first biometric information of the first user, generates the first key based on the first biometric information and the identifier information of the first terminal device, and generates the first verification information based on the first key. Further, the first terminal device sends the first verification information to the in-vehicle device. When verifying the first verification information, the in-vehicle device needs to perform authentication on both the first terminal device and the first biometric information of the first user. In other words, if the first user loses the first terminal device, the unauthorized user that obtains the first terminal device cannot control the vehicle based on only the identifier information of the first terminal device, and the first terminal device further needs to collect the biometric information of the unauthorized user. Because different users have different biometric information, the key generated by the first terminal device based on the biometric information of the unauthorized user and the identifier information of the first terminal device is different from the first key. When the first terminal device sends, to the in-vehicle device, the verification information generated by the first terminal device based on the key, the in-vehicle device cannot successfully verify the verification information, and the in-vehicle device cannot control the vehicle to start. This improves vehicle security.

DESCRIPTION OF EMBODIMENTS

Terms used in implementations of this disclosure are only used to explain specific embodiments of this disclosure, but are not intended to limit this disclosure.

Figure 1:
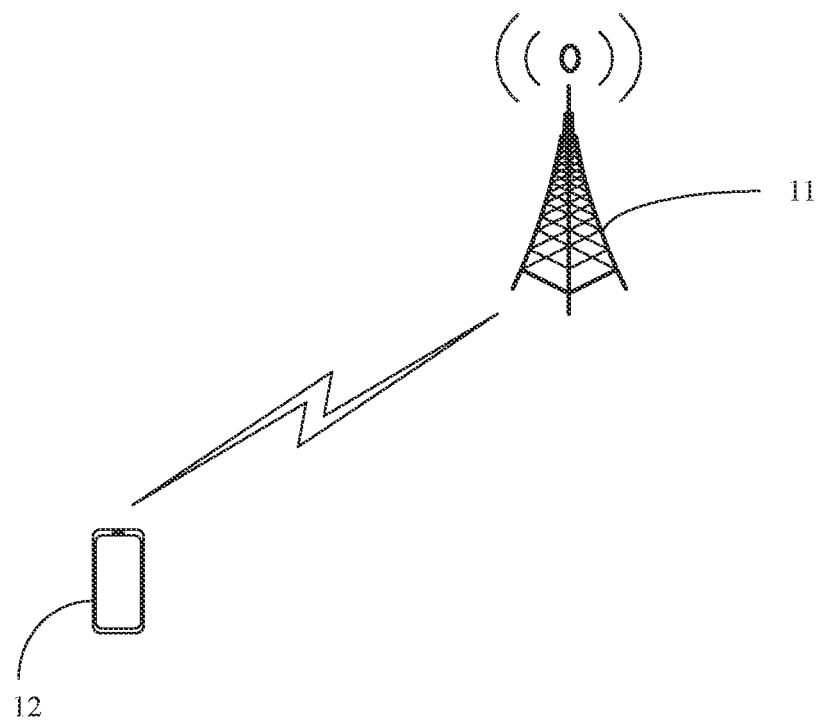
FIG. 1 is a schematic diagram of an application scenario according to an embodiment of this disclosure.

Embodiments of this disclosure may be applied to various types of communications systems. FIG. 1 is a schematic diagram of an application scenario according to an embodiment of this disclosure. A communications system shown in FIG. 1 mainly includes a network device 11 and a terminal device 12.

(1) The network device 11 may be a network side device, for example, an access point (AP) in a wireless local area network (WLAN), an evolved NodeB (eNB or eNodeB) in 4G, a next-generation NodeB (gNB) of a new radio access technology (NR) in 5G, a base station for next-generation communication, a satellite, a small cell, a micro base station, a relay station, a transmission and reception point (TRP), or a road side unit (RSU). For differentiation, a base station in a 4G communications system is referred to as a long term evolution (LTE) eNB, and a base station in a 5G communications system is referred to as an NR gNB. It may be understood that some base stations can support both the 4G communications system and the 5G communications system. In addition, these names of the base stations are only for ease of differentiation, but are not for limitation.

(2) The terminal device 12, also referred to as user equipment (UE), is a device that provides voice and/or data connectivity for a user. For example, the terminal device 12 is a handheld device with a wireless connection function, an in-vehicle device, or a vehicle with a vehicle to vehicle (V2V) communication capability. Common terminal devices include, for example, a mobile phone, a tablet computer, a notebook computer, a palmtop computer, a mobile Internet device (MID), a wearable device such as a smartwatch, a smart band, or a pedometer.

(3) The term "a plurality of" indicates two or more, and another quantifier is similar to the term "a plurality of". The term "and/or" describes a correspondence between associated objects and represents that three relationships may exist. For example, A and/or B may represent the following three cases: Only A exists, both A and B exist, and only B exists. The character "/" usually indicates an "or" relationship between associated objects.

It should be noted that a quantity and types of terminal devices 12 included in the communications system shown in FIG. 1 are merely an example. Embodiments of this disclosure are not limited thereto. For example, more terminal devices 12 that communicate with the network device 11 may be included. For brevity, details are not described in the accompanying drawings. In addition, although the network device 11 and the terminal device 12 are shown in the communications system shown in FIG. 1, the communications system may not be limited to including the network device 11 and the terminal device 12. For example, the communications system may further include a core network node, or a device configured to carry a virtualized network function. This is clear to a person of ordinary skill in the art. Details are not described herein.

In addition, embodiments of this disclosure may be applied to communications systems such as a 4G wireless communications system, a vehicle to everything (V2X) communications system, a device-to-device (D2D) communications system, a subsequent LTE evolved communications system, a 5G communications system, and a satellite communications system; and may further be applied to a next-generation wireless communications system. In addition, embodiments of this disclosure may be applied to another system that may emerge in the future, for example, a next-generation Wi-Fi network or 5G internet of vehicles.

It should be noted that with continuous evolution of the communications system, names of the foregoing network elements may change in another system that may emerge in the future. In this case, the solutions provided in embodiments of this disclosure are also applicable.

With the development of science and technology, a vehicle key used to control a vehicle has evolved from a physical vehicle key to a digital vehicle key based on a terminal device. However, both the physical vehicle key and the digital vehicle key have a problem about security. For example, the physical vehicle key is easily lost or cannot be found. The digital vehicle key may also be referred to as a smart vehicle key or a virtual vehicle key.

Figure 2:
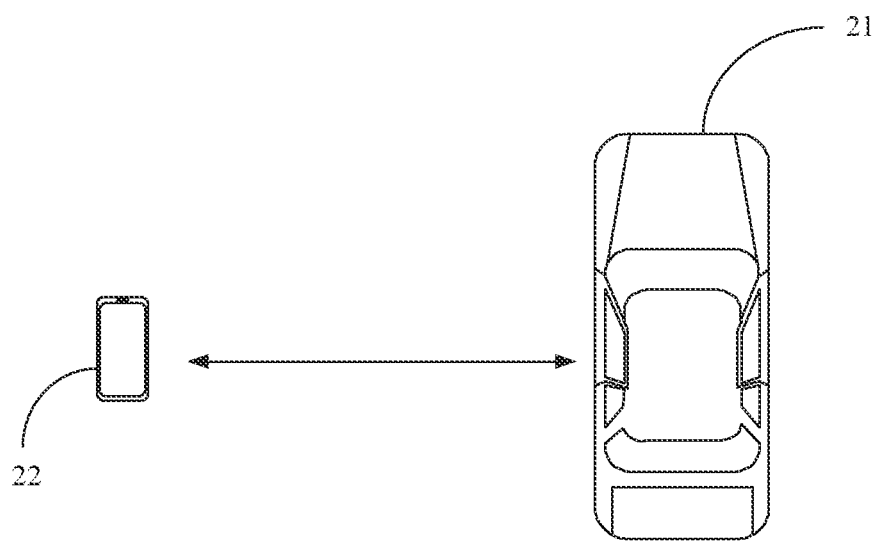
FIG. 2 is a schematic diagram of another application scenario according to an embodiment of this disclosure.

For the digital vehicle key, as shown in FIG. 2, 21 represents a vehicle, and 22 represents a terminal device configured to control the vehicle 21. An in-vehicle device may be disposed in the vehicle 21. The in-vehicle device may be specifically a central control module of the vehicle 21, and the in-vehicle device may be configured to control at least one module of the vehicle 21, for example, a vehicle door, an engine, an odometer, a speaker, or an air conditioner. In addition, a communication manner between the terminal device 22 and the in-vehicle device is not limited in this embodiment. For example, the terminal device 22 may communicate with the in-vehicle device in a wired manner, or a wireless manner. If the terminal device 22 communicates with the in-vehicle device in the wireless manner, the terminal device 22 may communicate with the in-vehicle device by using the network device shown in FIG. 1, or the terminal device 22 may communicate with the in-vehicle device through a wireless short-range communication protocol. For example, the terminal device 22 may communicate with the in-vehicle device through a Bluetooth communication protocol. In this embodiment of this disclosure, the terminal device 22 may be specifically a mobile phone. In another embodiment, the terminal device 22 may be specifically a smartwatch, a smart band, or the like.

Figure 3:
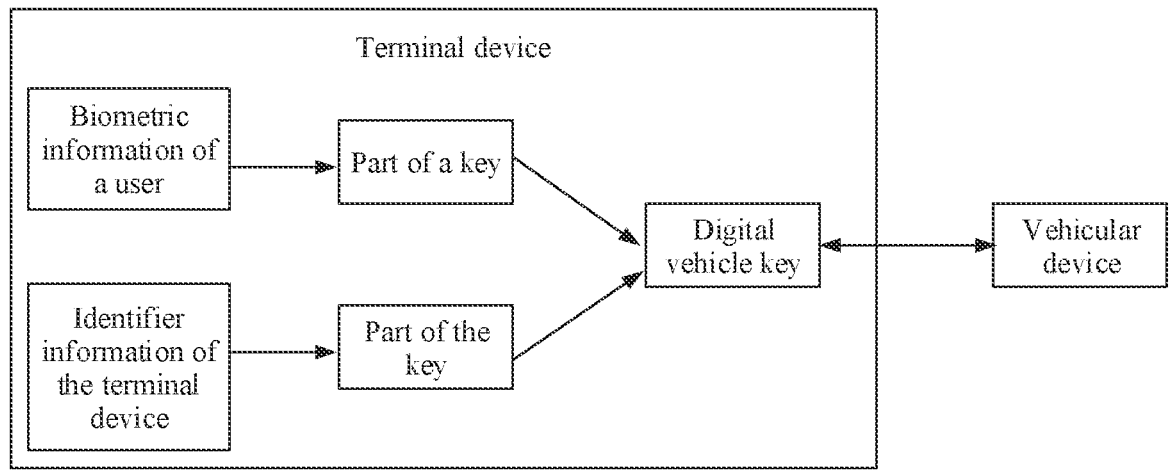
FIG. 3 is a schematic diagram of a method for generating a digital vehicle key according to an embodiment of this disclosure.

Generally, security of the digital vehicle key is higher than security of the physical vehicle key. However, for the digital vehicle key, the in-vehicle device performs authentication only on the terminal device 22. If the terminal device 22 is lost, any user who obtains the terminal device 22 can easily open a vehicle door and control the vehicle, resulting in low vehicle security. To resolve this problem, embodiments of this disclosure provide a vehicle control method. As shown in FIG. 3, in the method, one part of a key may be generated based on biometric information of a user, the other part of the key may be generated based on identifier information of a terminal device, and the two parts of key are synthesized into a digital vehicle key, so that when a user controls a vehicle by using the terminal device, an in-vehicle device needs to perform authentication on both the terminal device and biometric information of the user.

Figure 4:
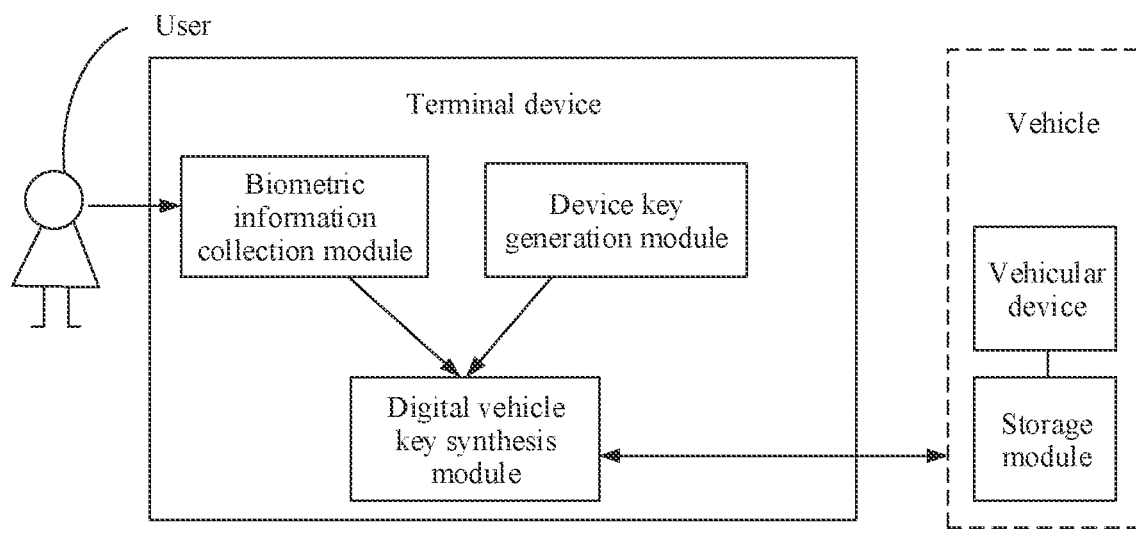
FIG. 4 is a schematic diagram of another method for generating a digital vehicle key according to an embodiment of this disclosure.

A system architecture corresponding to the vehicle control method in embodiments of this disclosure is shown in FIG. 4. The terminal device may specifically include, a biometric information collection module, a device key generation module, and a digital vehicle key synthesis module. The biometric information collection module may be configured to collect the biometric information of the user, and generate one part of the key based on the biometric information of the user. The device key generation module may be configured to generate the other part of the key based on the identifier information of the terminal device. When the terminal device is a mobile phone, the identifier information of the terminal device may be a mobile phone number or a hardware identifier of the mobile phone. When the terminal device is a smartwatch, the identifier information of the terminal device may be a hardware identifier of the smartwatch. The digital vehicle key synthesis module may synthesize the part of the key output by the biometric information collection module and the other part of the key output by the device key generation module into the digital vehicle key. A storage module may be disposed on a vehicle side, and the storage module may be configured to store the digital vehicle key. The storage module may be integrated into the in-vehicle device, or may not be integrated into the in-vehicle device. For example, as shown in FIG. 4, the in-vehicle device and the storage module may be separately deployed in the vehicle. The in-vehicle device may verify, based on the digital vehicle key stored in the storage module, verification information generated by the terminal device. After the in-vehicle device successfully verifies the verification information generated by the terminal device, the in-vehicle device may control the vehicle to start, for example, control a module such as a vehicle door or an engine to enable. Specifically, the digital vehicle key may be a symmetric key, or may be a public key in an asymmetric key. In addition, the storage module may further store permission information of the user for controlling the vehicle, for example, which functions of the vehicle can be used by the user, which modules of the vehicle can be controlled by the user, a mileage that the user can control the vehicle to drive, and time that the user can control the vehicle.

Specifically, the user is a vehicle owner, and the terminal device is a terminal device of the vehicle owner. In other words, the vehicle owner may control the vehicle by using the digital vehicle key generated by the terminal device of the vehicle owner. In addition, in another embodiment, the vehicle owner may further authorize control permission on the vehicle to a vehicle renter, so that the vehicle renter uses the vehicle of the vehicle owner. In this case, the terminal device of the vehicle owner needs to send a key or signature information to a terminal device of the vehicle renter, so that the vehicle renter controls the vehicle of the vehicle owner by using the terminal device of the vehicle renter. To distinguish between the vehicle owner and the vehicle renter, in embodiments of this disclosure, a first user may be the vehicle owner, and a second user may be the vehicle renter. To distinguish the terminal device of the vehicle owner from the terminal device of the vehicle renter, the terminal device of the vehicle owner may be denoted as a first terminal device, and the terminal device of the vehicle renter may be denoted as a second terminal device. With reference to an embodiment, the following describes in detail the method for controlling the vehicle by the first user.

Figure 5:
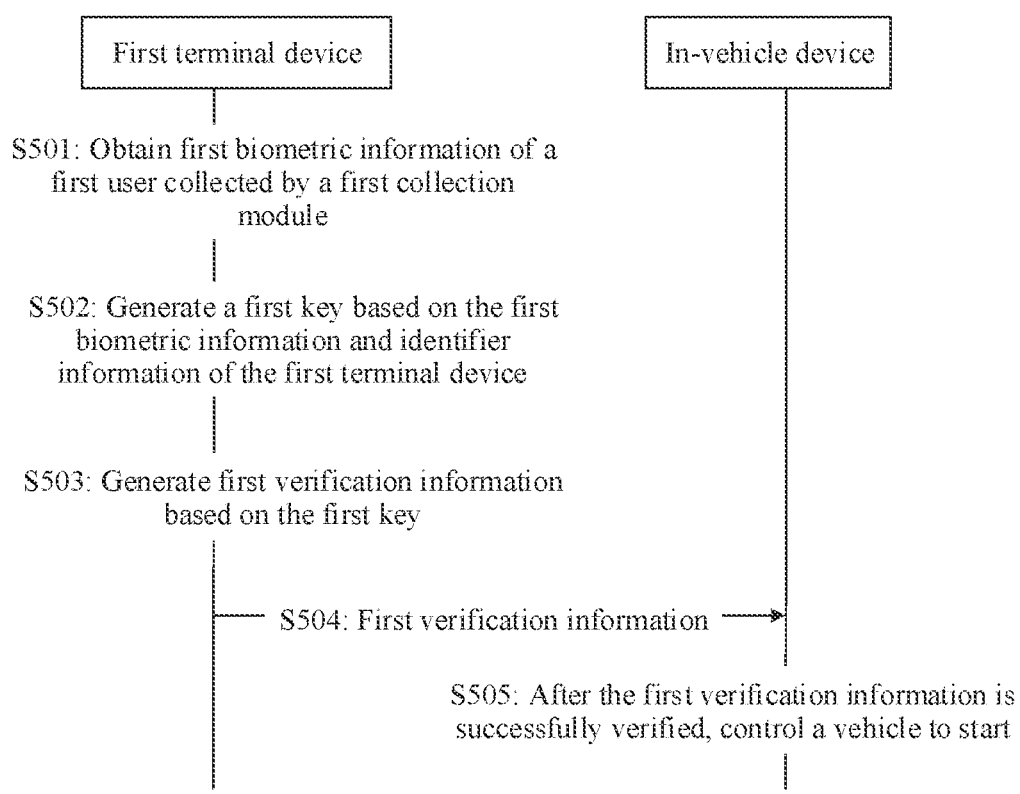
FIG. 5 is a flowchart of a vehicle control method according to an embodiment of this disclosure.

FIG. 5 is a flowchart of the vehicle control method according to this embodiment of this disclosure. As shown in FIG. 5, the vehicle control method in this embodiment includes the following steps.

S501: The first terminal device obtains first biometric information of the first user collected by a first collection module.

Figure 6:
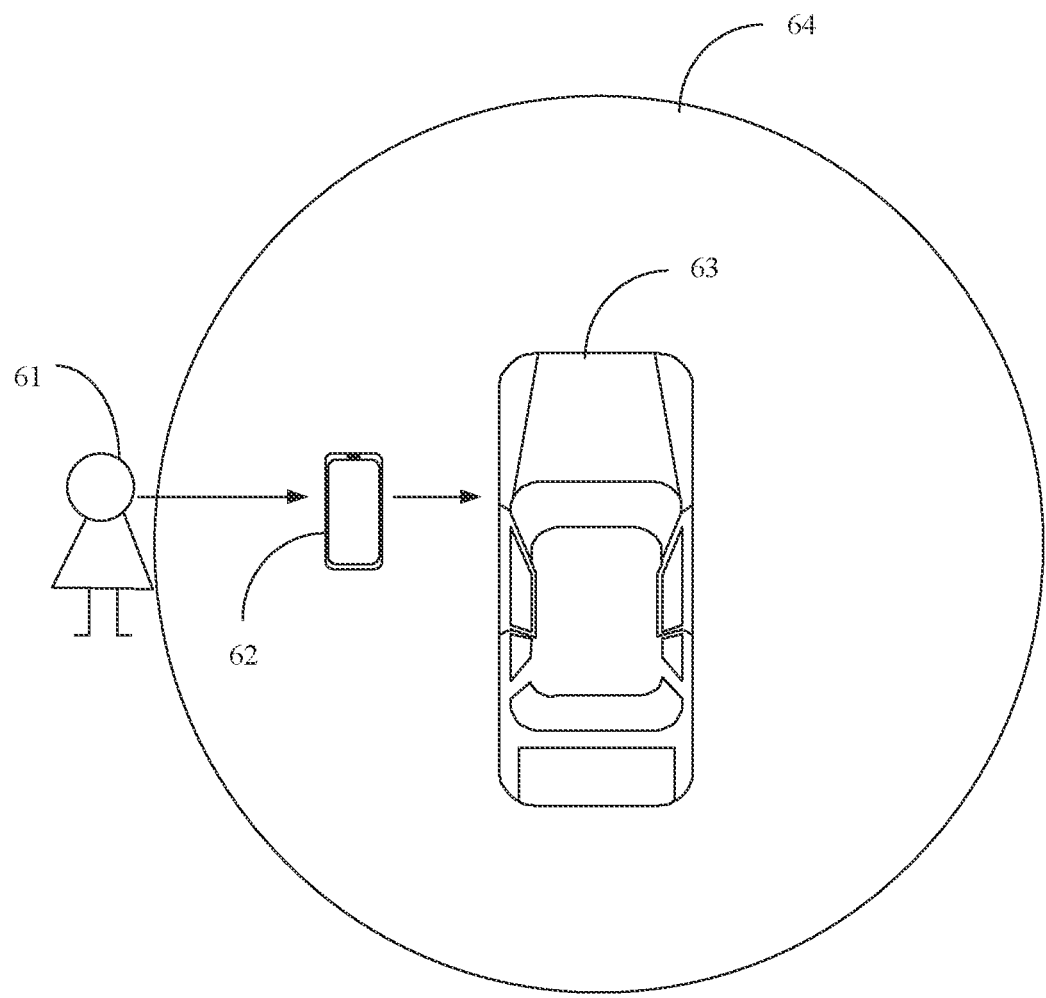
FIG. 6 is a schematic diagram of another application scenario according to an embodiment of this disclosure.

As shown in FIG. 6, when a terminal device of a vehicle owner 61, namely, a first terminal device 62, is located in a preset area 64 around a vehicle 63 of the vehicle owner 61, the first terminal device 62 may collect biometric information of the vehicle owner 61 by using a first collection module. The first collection module may be specifically the biometric information collection module described above. Herein, the biometric information of the vehicle owner 61 is the first biometric information, and the first biometric information may be specifically information such as a fingerprint, an iris, a voiceprint, face information, and a gait of the vehicle owner 61.

S502: The first terminal device generates a first key based on the first biometric information and identifier information of the first terminal device.

The first terminal device 62 may generate one part of a key based on the first biometric information of the vehicle owner 61, where the part of the key is denoted as a first-part key, and the first-part key may be denoted as K1. In addition, the first terminal device 62 may further generate the other part of the key based on identifier information of the first terminal device 62, where the other part of the key may be denoted as a second-part key, and the second-part key may be denoted as K2. Further, the first terminal device 62 may generate a first key based on the first-part key K1 and the second-part key K2, where the first key may be a symmetric key or may be a private key.

S503: The first terminal device generates to-be-verified first verification information based on the first key.

The first terminal device 62 may further generate to-be-verified first verification information based on the first key. For example, when the first key is the symmetric key, the symmetric key may be denoted as K. The first terminal device 62 may generate the first verification information based on the symmetric key K and identifier information of the vehicle 63 (for example, an ID of the vehicle 63). For example, the first verification information may be a hash-based message authentication code (HMAC). The hash-based message authentication code may be a digest obtained through calculation by using a hash algorithm and by using the symmetric key K and the ID of the vehicle 63 as input. The hash-based message authentication code may be represented as HMAC (K, ID).

For another example, when the first key is the private key, the private key may be denoted as SK. The first terminal device 62 may generate the first verification information based on the private key SK and an ID of the vehicle 63. For example, the first terminal device 62 may sign the ID of the vehicle 63 by using the private key, that is, the first terminal device 62 may calculate, by using a hash function, a hash value corresponding to the ID of the vehicle 63; and further encrypt the hash value by using the private key. An obtained ciphertext is a digital signature, and the digital signature may be used as the first verification information. The hash function may be specifically a hash algorithm, and the hash value may be specifically a hash value.

S504: The first terminal device sends the first verification information to the in-vehicle device, and correspondingly, the in-vehicle device receives the first verification information.

The first terminal device 62 may send the first verification information to an in-vehicle device of the vehicle 63. Correspondingly, after receiving the first verification information, the in-vehicle device verifies the first verification information.

S505: The in-vehicle device verifies the first verification information by using a preset digital vehicle key, and if the verification succeeds, controls the vehicle to start.

Specifically, the in-vehicle device may pre-store the digital vehicle key. After receiving the first verification information, the in-vehicle device verifies the first verification information by using the digital vehicle key. Specifically, the digital vehicle key may be a decryption key corresponding to the first key.

For example, when the first key is the symmetric key, the symmetric key is an encryption key and a decryption key at the same time, and therefore the digital vehicle key is the symmetric key. After the in-vehicle device receives the first verification information, the in-vehicle device may generate one hash-based message authentication code based on the symmetric key pre-stored in the in-vehicle device and the ID of the vehicle 63. If the hash-based message authentication code is consistent with the first verification information, the in-vehicle device successfully verifies the first verification information, and further, the in-vehicle device may control the vehicle 63 to start, for example, control a module such as a vehicle door or an engine to enable.

For another example, when the first key is the private key, the private key SK may be used as an encryption key, a public key PK corresponding to the private key SK may be used as a decryption key, and therefore the digital vehicle key is the public key PK. After the in-vehicle device receives the first verification information, the in-vehicle device may decrypt the first verification information by using the public key PK, to obtain a hash value corresponding to the ID of the vehicle 63. Further, the in-vehicle device may calculate, based on the hash function, the hash value corresponding to the ID of the vehicle 63. If the hash value obtained by the in-vehicle device through decryption is consistent with the hash value obtained by the in-vehicle device through calculation based on the hash function, the in-vehicle device successfully verifies the first verification information. Further, the in-vehicle device may control the vehicle 63 to start, for example, control a module such as a vehicle door or an engine to enable.

In this embodiment, the first terminal device collects the first biometric information of the first user, generates the first key based on the first biometric information and the identifier information of the first terminal device, and generates the first verification information based on the first key. Further, the first terminal device sends the first verification information to the in-vehicle device. When verifying the first verification information, the in-vehicle device needs to perform authentication on both the first terminal device and the first biometric information of the first user. In other words, if the first user loses the first terminal device, an unauthorized user that obtains the first terminal device cannot control the vehicle based on only the identifier information of the first terminal device, and the first terminal device further needs to collect biometric information of the unauthorized user. Because different users have different biometric information, a key generated by the first terminal device based on the biometric information of the unauthorized user and the identifier information of the first terminal device is different from the first key. When the first terminal device sends, to the in-vehicle device, verification information generated by the first terminal device based on the key, the in-vehicle device cannot successfully verify the verification information, and the in-vehicle device cannot control the vehicle to start. This improves vehicle security.

Figure 7:
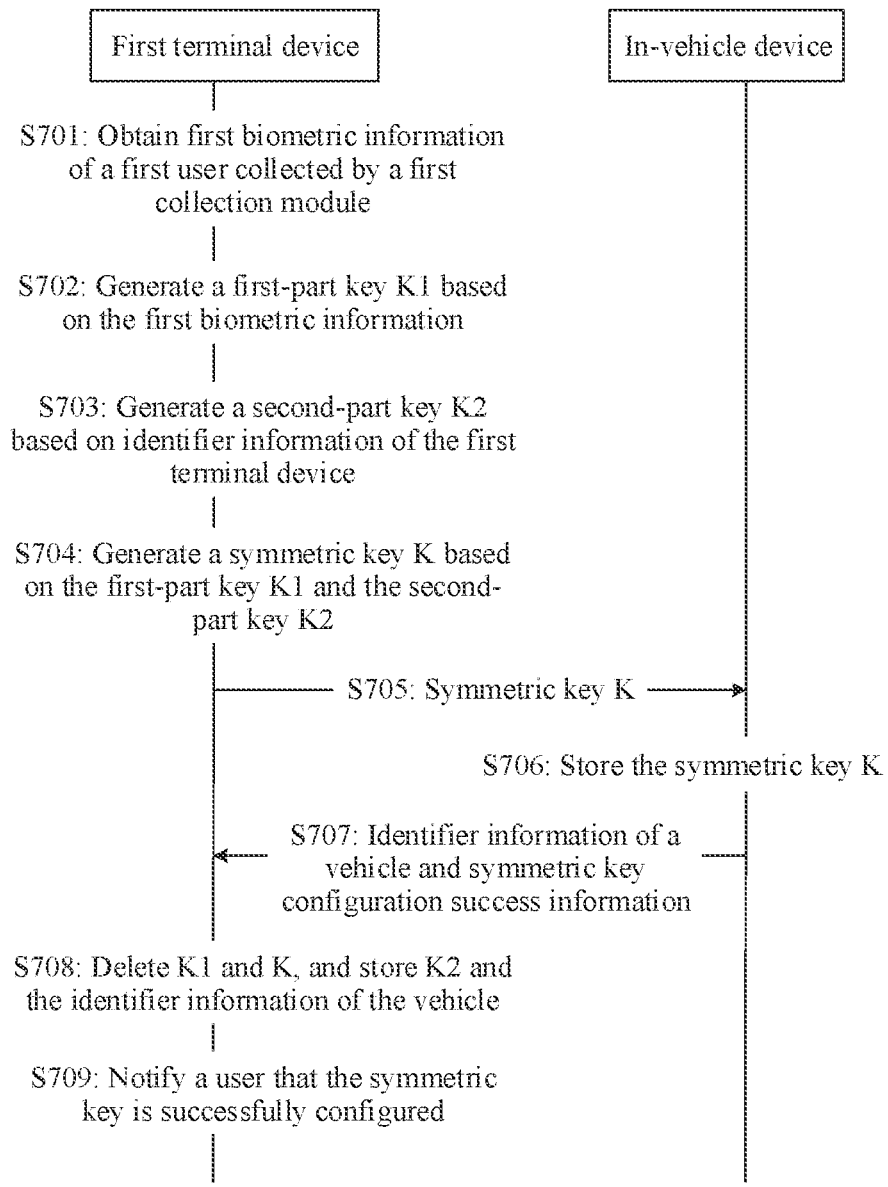
FIG. 7 is a flowchart of another vehicle control method according to an embodiment of this disclosure.

On the basis of the foregoing embodiment, before S501, the first terminal device may further obtain the digital vehicle key based on the first biometric information of the first user and the identifier information of the first terminal device, and send the digital vehicle key to the in-vehicle device, that is, a process of configuring the digital vehicle key is performed. Generally, this configuration process needs to be performed only once when the vehicle is delivered from a factory or the vehicle owner purchases the vehicle. The digital vehicle key may be a symmetric key of the first key, or may be an asymmetric key of the first key. For example, when the first key is the symmetric key, the digital vehicle key is the first key. When the first key is the private key in the asymmetric key, the digital vehicle key is the public key corresponding to the private key. With reference to a specific embodiment, the following describes, by using an example in which the digital vehicle key is the symmetric key, the process of configuring the digital vehicle key. As shown in FIG. 7, the process specifically includes the following steps.

S701: The first terminal device obtains the first biometric information of the first user collected by the first collection module.

S702: The first terminal device generates a first-part key K1 based on the first biometric information.

S703: The first terminal device generates a second-part key K2 based on the identifier information of the first terminal device.

S704: The first terminal device generates the symmetric key K based on the first-part key K1 and the second-part key K2.

Specifically, an implementation process of S701 to S704 is similar to an implementation process of S501 to S503. Details are not described herein again.

S705: The first terminal device sends the symmetric key K to the in-vehicle device.

Specifically, the first terminal device may send the symmetric key K to the in-vehicle device through a secure channel. A specific form of the secure channel is not limited in this embodiment of this disclosure. For example, the secure channel may be a wired connection, or a short-range wireless communication manner (for example, a Bluetooth pairing manner).

S706: The in-vehicle device stores the symmetric key K.

S707: The in-vehicle device sends identifier information of the vehicle and symmetric key configuration success information to the first terminal device.

S708: The first terminal device deletes K1 and K. and stores K2 and the identifier information of the vehicle.

For example, the first terminal device deletes the first biometric information of the vehicle owner, the first-part key K1 generated based on the first biometric information, and the symmetric key K. In this way, each time the vehicle owner controls the vehicle by using the first terminal device, the first terminal device needs to re-collect the biometric information of the vehicle owner and re-generate the symmetric key K, to prevent the symmetric key K from being stored in the first terminal device for a long time. When the first terminal device is lost by the vehicle owner, if the unauthorized user who finds the first terminal device wants to control the vehicle by using the first terminal device, the first terminal device needs to re-collect the biometric information of the unauthorized user, and generate the new key based on the biometric information of the unauthorized user and the identifier information of the first terminal device. Because different users have different biometric information, the new key is different from the symmetric key K, and the in-vehicle device cannot successfully verify the verification information generated by the first terminal device based on the new key, the in-vehicle device cannot control the vehicle to start. This further improves vehicle security.

S709: The first terminal device notifies the user that the symmetric key is successfully configured.

In addition, in another embodiment, the vehicle owner may further configure, on the first terminal device, the control permission of the vehicle owner on the vehicle, for example, which functions of the vehicle can be used by the vehicle owner, which modules of the vehicle can be controlled by the vehicle owner, a mileage that the vehicle owner can control the vehicle to drive, and time that the vehicle owner can control the vehicle. This can limit the control permission of the vehicle owner on the vehicle, and improve vehicle security. The control permission of the vehicle owner on the vehicle is not limited herein. For example, the vehicle owner may control all modules of the vehicle, and the mileage or time that the vehicle owner controls the vehicle to travel may not be limited.

Correspondingly, in S705, when the first terminal device sends the symmetric key K to the in-vehicle device, the first terminal device further sends first permission information to the in-vehicle device, where the first permission information may be denoted as Policy1. The first permission information is used to indicate the control permission of the vehicle owner on the vehicle. The first permission information is permission information, of the vehicle owner, generated by the first terminal device. Specifically, the first terminal device may generate the first permission information before S705. Correspondingly, in S706, the in-vehicle device stores the symmetric key K and the first permission information.

In this embodiment, after the first terminal device sends the digital vehicle key to the in-vehicle device, the first terminal device deletes the first biometric information of the vehicle owner and the digital vehicle key. This can prevent the first biometric information of the vehicle owner from being stored in the first terminal device and the in-vehicle device, and reduce a risk of leaking the first biometric information of the vehicle owner.

Figure 8:
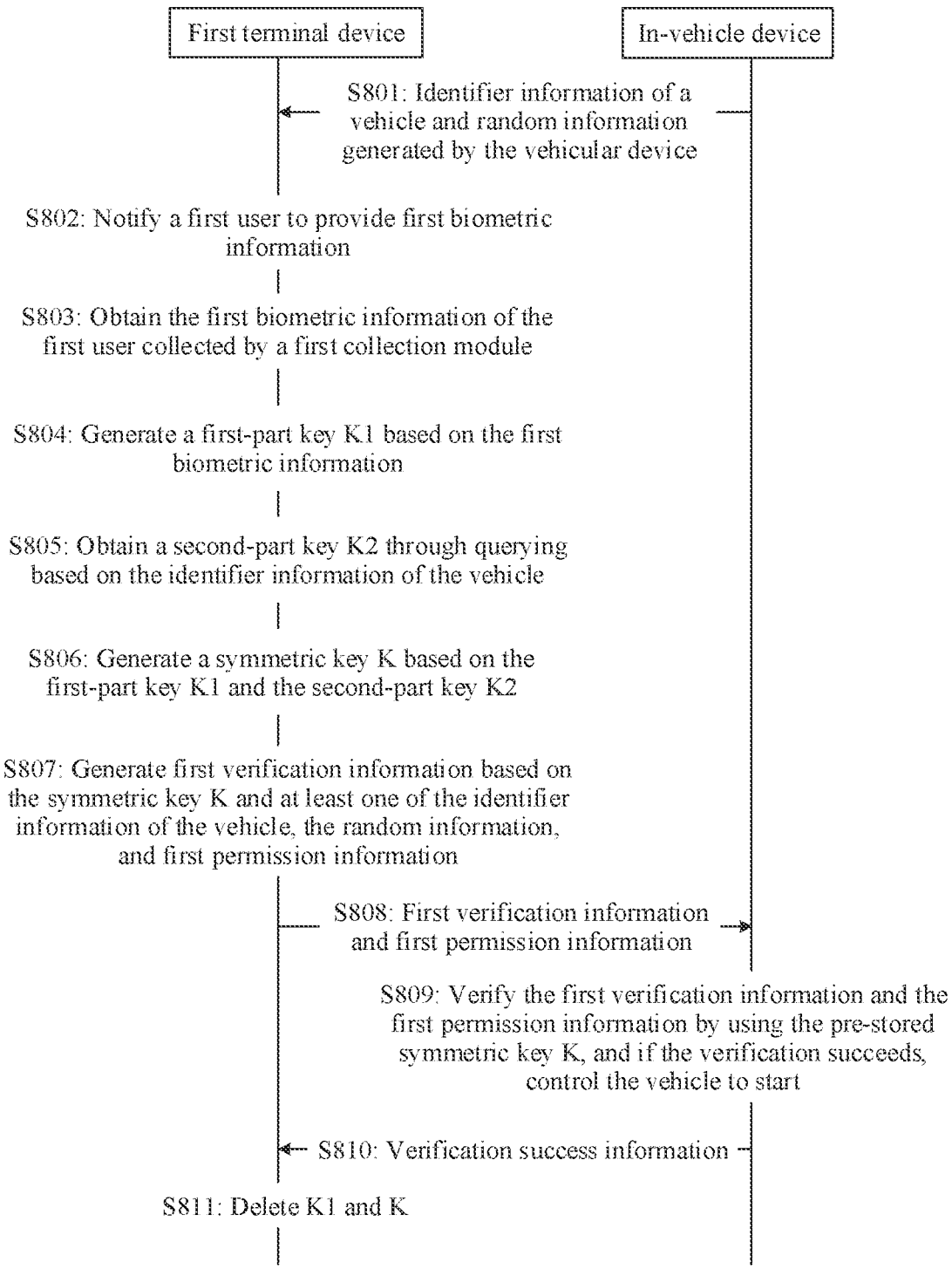
FIG. 8 is a flowchart of still another vehicle control method according to an embodiment of this disclosure.

With reference to a specific embodiment, the following describes a process in which the in-vehicle device controls, by using the pre-stored digital vehicle key, the vehicle to start. As shown in FIG. 8, the process specifically includes the following steps.

S801: The in-vehicle device sends the identifier information of the vehicle and random information generated by the in-vehicle device to the first terminal device.

For example, as shown in FIG. 6, when the first terminal device 62 is located in the preset area 64 around the vehicle 63 of the vehicle owner 61, the in-vehicle device of the vehicle 63 sends the identifier information of the vehicle (for example, the ID of the vehicle) and random information generated by the in-vehicle device to the first terminal device 62, where the random information is denoted as Nonce. Nonce may be specifically a random value, and each time the in-vehicle device generates a different random value. In other words, each time the vehicle owner carrying the first terminal device is located in the preset area 64 around the vehicle 63, the in-vehicle device generates one different random value.

S802: The first terminal device notifies the first user to provide the first biometric information.

For example, the first terminal device may notify, by using a text, a voice, interface display content, or the like, the vehicle owner to provide the biometric information.

S803: The first terminal device collects the first biometric information of the first user.

S804: The first terminal device generates the first-part key K1 based on the first biometric information.

S805: ne first terminal device obtains the second-part key K2 through querying based on the identifier information of the vehicle.

For example, in S708, the first terminal device stores K2 and the identifier information of the vehicle. Therefore, when receiving the identifier information of the vehicle sent by the in-vehicle device, the first terminal device may obtain the second-part key K2 through querying based on the identifier information of the vehicle.

S806: The first terminal device generates the symmetric key K based on the first-part key K1 and the second-part key K2.

S807: The first terminal device generates the first verification information based on the symmetric key K and at least one of the identifier information of the vehicle, the random information, and the first permission information.

The first permission information Policy1 is permission information generated by the first terminal device for the first user to control the vehicle. Specifically, the first terminal device may generate the first permission information before S807.

Specifically, the first terminal device may generate the to-be-verified first verification information based on HMAC (K, M), where K represents the symmetric key, and M represents the at least one of the identifier information of the vehicle, the random information generated by the in-vehicle device, and the first permission information.

In a possible manner. M may include the first permission information Policy1. For example, the first terminal device may generate a message authentication code based on HMAC (K, vehicle ID||Nonce||Policy1), and the message authentication code may be used as the first verification information. "Vehicle ID||Nonce||Policy1" indicates that M includes the ID of the vehicle, Nonce, and Policy1.

S808: The first terminal device sends the first verification information and the first permission information to the in-vehicle device.

It may be understood that, if M includes the first permission information Policy1, the first terminal device may further send the first permission information to the in-vehicle device when sending the first verification information to the in-vehicle device. For example, the first terminal device sends HMAC (K, vehicle ID||Nonce||Policy1) and Policy1 to the in-vehicle device.

S809: The in-vehicle device verifies the first verification information and the first permission information by using the pre-stored symmetric key K, and if the verification succeeds, controls the vehicle to start.

For example, after the in-vehicle device receives HMAC (K, vehicle ID||Nonce||Policy1) and Policy1, the in-vehicle device may recalculate one message authentication code by using pre-stored K, the ID of the vehicle and Nonce that are sent by the in-vehicle device in S801, and Policy1 received by the in-vehicle device. The calculation method is the same as a method for calculating HMAC (K, vehicle ID||Nonce-||Policy1). If the message authentication code obtained through recalculation is consistent with HMAC (K, vehicle IDI||Nonce||Policy1) received by the in-vehicle device, the in-vehicle device successfully verifies HMAC (K, vehicle ID||Nonce||Policy1) and Policy1 that are sent by the first terminal device. Further, the in-vehicle device controls the vehicle to start.

It may be understood that, in some other embodiments, if the first terminal device sends the symmetric key K and the first permission information to the in-vehicle device in S705, and the in-vehicle device stores the symmetric key K and the first permission information in S706, when the first terminal device generates the first verification information based on HMAC (K. M), and M includes the first permission information Policy1, the first terminal device may send the first verification information to the in-vehicle device, but does not send the first permission information in S808. In S809, the in-vehicle device may verify the first verification information by using pre-stored K and the first permission information. A specific verification process is described above. Details are not described herein again.

S810: The in-vehicle device sends verification success information to the first terminal device.

S811: The first terminal device deletes K1 and K.

Specifically, the first terminal device may delete the first biometric information of the vehicle owner collected by the first terminal device in S803, the first-part key K1 generated by the first terminal device based on the first biometric information in S804, and the symmetric key K generated by the first terminal device based on the first-part key K1 and the second-part key K2 in S806. This avoids a risk of leaking the first biometric information of the vehicle owner. In addition, each time the vehicle owner controls the vehicle by using the first terminal device, the first terminal device needs to re-collect the biometric information of the vehicle owner and re-generate the symmetric key K. This prevents the symmetric key K from being stored in the first terminal device for a long time, and further improves vehicle security.

Figure 9:
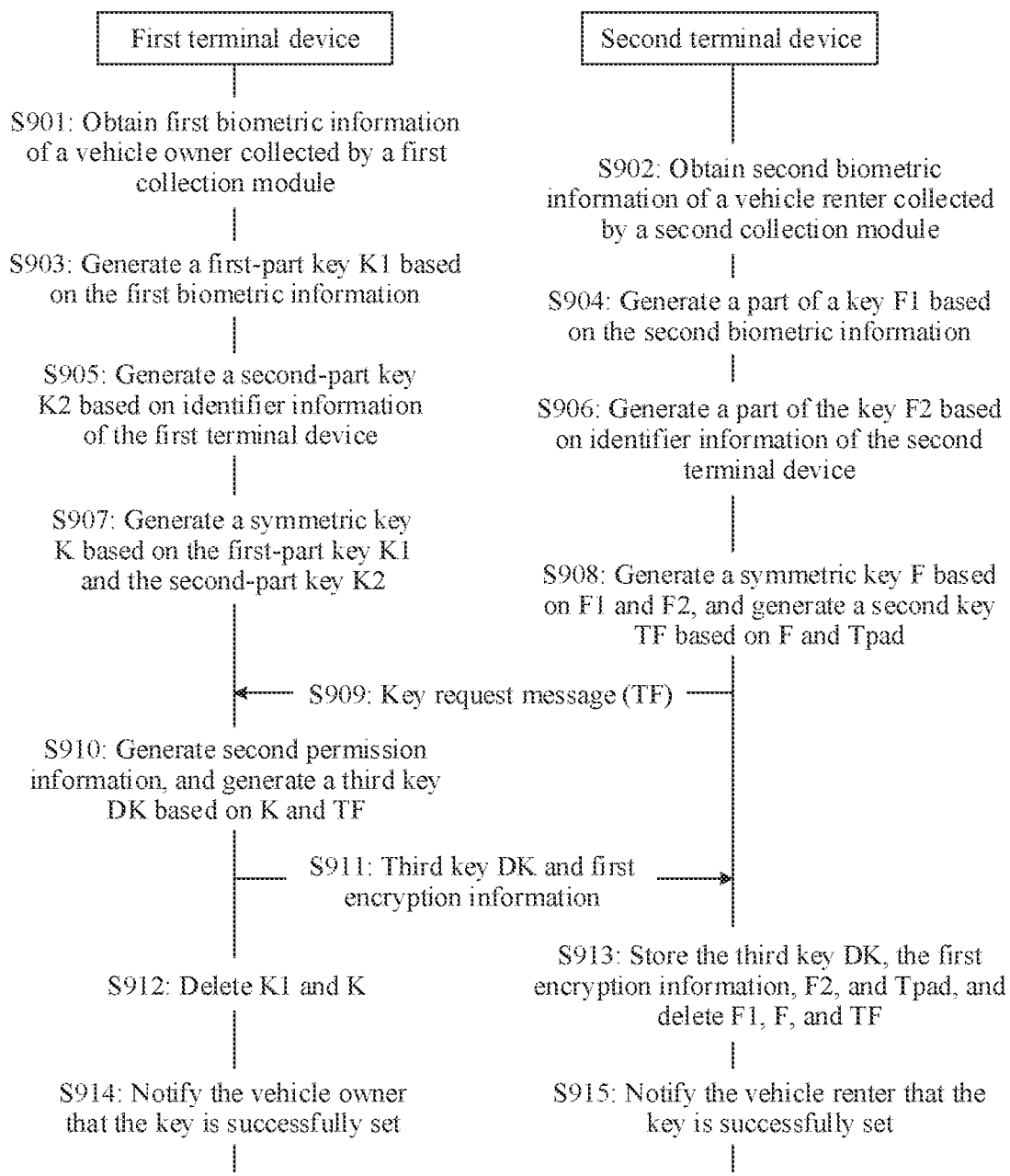
FIG. 9 is a flowchart of still another vehicle control method according to an embodiment of this disclosure.

The foregoing embodiments describe the process in which the vehicle owner configures the digital vehicle key (for example, the symmetric key) for the in-vehicle device by using the first terminal device, and the process in which the vehicle owner controls, by using the first terminal device, the vehicle to start. In some other embodiments, the vehicle owner may further authorize, on the first terminal device, another user to use the vehicle of the vehicle owner. The following describes, by using an embodiment, a process in which the vehicle owner sends authorization information to the second terminal device of the second user by using the first terminal device. The authorization information is used to authorize the second user to control the vehicle. The second user may be specifically a user that is authorized by the first user to control the vehicle, namely, the vehicle renter. As shown in FIG. 9, the process specifically includes the following steps.

S901: The first terminal device obtains the first biometric information of the vehicle owner collected by the first collection module.

S902: The second terminal device obtains second biometric information of the vehicle renter collected by a second collection module.

For example, a biometric information collection module may also be disposed in the second terminal device of the vehicle renter. The biometric information collection module is configured to collect biometric information of the vehicle renter. Herein, the biometric information collection module in the second terminal device is denoted as the second collection module, the biometric information of the vehicle renter is denoted as the second biometric information, the second biometric information may be specifically information such as a fingerprint, an iris, a voiceprint, face information, or a gait of the vehicle renter. In addition, an execution sequence of S901 and S902 is not limited in this embodiment. Likewise, an execution sequence between S903 and S904, an execution sequence between S905 and S906, an execution sequence between S907 and S908, an execution sequence between S912 and S913, and an execution sequence between S914 and S915 are not limited in this embodiment.

S903: The first terminal device generates the first-part key K1 based on the first biometric information.

S904: The second terminal device generates a part of key F1 based on the second biometric information.

S905: The first terminal device generates the second-part key K2 based on the identifier information of the first terminal device.

S906: The second terminal device generates a part of key F2 based on identifier information of the second terminal device.

S907: The first terminal device generates the symmetric key K based on the first-part key K1 and the second-part key K2.

S908: The second terminal device generates a symmetric key F based on F1 and F2, and generates a second key TF based on F and Tpad.

For example, after the second terminal device generates the symmetric key F based on F1 and F2, the second terminal device may further generate Tpad. Tpad may be specifically a random number, a counter, or Nonce described above. Further, the second terminal device generates the second key TF based on F and Tpad, and TF may be represented as TF=KDF (Tpad, F). A KDF is a key derivation function.

S909: The second terminal device sends a key request message to the first terminal device, where the key request message includes the second key TF.

For example, the second terminal device sends the key request message to the first terminal device through a secure channel.

S910: The first terminal device generates second permission information, and generates a third key DK based on K and TF.

After receiving the key request message sent by the second terminal device, the first terminal device may generate, based on the second key TF in the key request message, permission information for the vehicle renter to control the vehicle, where the permission information is denoted as the second permission information, and the second permission information is used to indicate the control permission of the vehicle renter on the vehicle of the vehicle owner, for example, which functions of the vehicle can be used by the vehicle renter, which modules of the vehicle can be controlled by the vehicle renter, a mileage that the vehicle renter can control the vehicle to drive, and time that the vehicle renter can control the vehicle. Specifically, the second permission information may be denoted as Policy2. In addition, the second permission information may further include the second key TF. In addition, the first terminal device may further generate the third key DK based on K generated in S907 and TF included in the key request message. The third key DK may be represented as DK=KDF (K, TF). The third key DK may be used as the authorization information provided by the vehicle owner to the vehicle renter.

S911: The first terminal device sends the third key DK and first encryption information to the second terminal device.

The first terminal device may send the third key DK and the first encryption information to the second terminal device through the secure channel, where the first encryption information may be encryption information obtained after the first terminal device encrypts Policy2 by using K. It may be understood that, in this embodiment, the first terminal device sends the first encryption information to the second terminal device, so that the second terminal device can send the first encryption information to the in-vehicle device, and the in-vehicle device can decrypt the first encryption information by using the pre-stored digital vehicle key, to obtain the second key in the second permission information.

In some other embodiments, if the in-vehicle device may obtain the second key in another manner, in S911, the first terminal device may send the third key DK to the second terminal device, but does not send the first encryption information. For example, after the second terminal device sends the key request message to the first terminal device, the first terminal device may send the second key in the key request message to the in-vehicle device.

S912: The first terminal device deletes K1 and K.

S913: The second terminal device stores the third key DK, the first encryption information, F2, and Tpad, and deletes F1, F, and TF.

Specifically, the second terminal device may store a correspondence between the ID of the vehicle, the third key DK, the first encryption information, F2, and Tpad.

S914: The first terminal device notifies the vehicle owner that the key is successfully set.

S915: The second terminal device notifies the vehicle renter that the key is successfully set.

In addition, in an alternative manner, at least one of the foregoing steps S909, S911, and S913 may further include the ID of the vehicle. For example, in S909, the second terminal device may further send, to the first terminal device, the ID of the vehicle that the vehicle renter requests to rent. In S911, the first terminal device sends the ID of the vehicle, the third key DK, and the first encryption information to the second terminal device. In S913, the second terminal device stores the ID of the vehicle, the third key DK, the first encryption information, F2, and Tpad, and deletes F1, F, and TF.

In this embodiment, the first terminal device of the vehicle owner sends the authorization information to the second terminal device of the vehicle renter, so that the vehicle owner can authorize, on the first terminal device, the vehicle renter to use the vehicle of the vehicle owner. Compared with a solution in which the vehicle renter needs to obtain a physical vehicle key from the vehicle owner, and after using the vehicle, the vehicle renter needs to return the physical vehicle key to the vehicle owner, this solution improves flexibility and convenience of a vehicle rental service. In addition, in the process in which the vehicle owner authorizes, on the first terminal device, the vehicle renter to use the vehicle of the vehicle owner, configuration does not need to be performed on the in-vehicle device. This further improves convenience of the vehicle rental service. In addition, the vehicle owner may further generate permission information for the vehicle renter, to limit permission of the vehicle renter to control the vehicle. This further improves vehicle security and flexibility of the vehicle rental service.

Figure 10:
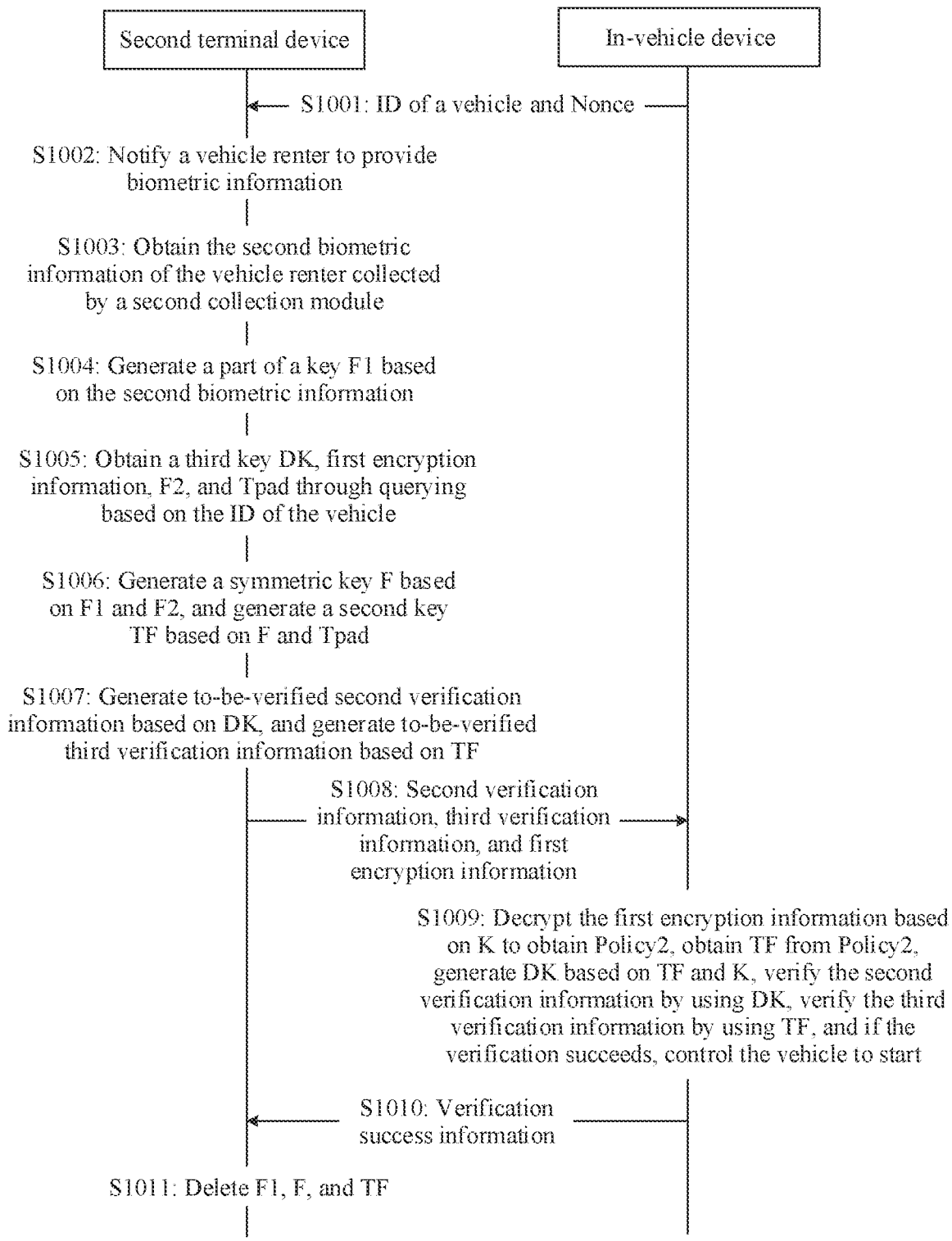
FIG. 10 is a flowchart of yet another vehicle control method according to an embodiment of this disclosure.

The following describes, with reference to a specific embodiment, a process in which the vehicle renter controls the vehicle based on the authorization information from the vehicle owner. As shown in FIG. 10, the process specifically includes the following steps.

S1001: The in-vehicle device sends the ID of the vehicle and Nonce to the second terminal device.

For example, when the vehicle renter carrying the second terminal device is located around the vehicle rent by the vehicle renter, the in-vehicle device of the vehicle sends the ID of the vehicle and Nonce to the second terminal device.

S1002: The second terminal device notifies the vehicle renter to provide the biometric information.

For example, the second terminal device may notify, by using a text, a voice, interface display content, or the like, the vehicle renter to provide the biometric information.

S1003: The second terminal device obtains the second biometric information of the vehicle renter collected by the second collection module.

S1004: The second terminal device generates the part of key F1 based on the second biometric information.

S1005: The second terminal device obtains the third key DK, the first encryption information, F2, and Tpad through querying based on the ID of the vehicle.

For example, in S913, the second terminal device may store the ID of the vehicle, the third key DK, the first encryption information, F2, and Tpad. When the second terminal device receives the ID of the vehicle sent by the in-vehicle device, the second terminal device may obtain the third key DK, the first encryption information, F2, and Tpad through querying based on the ID of the vehicle.

S1006: The second terminal device generates the symmetric key F based on F1 and F2, and generates the second key TF based on F and Tpad.

For example, TF=KDF (Tpad, F).

S1007: The second terminal device generates to-be-verified second verification information based on DK, and generates to-be-verified third verification information based on TF.

For example, the second terminal device generates the second verification information based on DK, the ID of the vehicle, and Nonce, and the second verification information may be represented as HMAC (DK, vehicle ID||Nonce). The second terminal device generates the third verification information based on TF, the ID of the vehicle, and Nonce, and the third verification information may be represented as HMAC (TF, vehicle ID||Nonce).

S1008: The second terminal device sends the second verification information, the third verification information, and the first encryption information to the in-vehicle device.

S1009: The in-vehicle device decrypts the first encryption information based on K to obtain Policy2, obtains TF from Policy2, generates DK based on TF and K, verifies the second verification information by using DK, verifies the third verification information by using TF, and if the verification succeeds, controls the vehicle to start.

For example, the in-vehicle device decrypts the first encryption information based on the pre-stored symmetric key K, for example, the symmetric key K stored in S706, to obtain Policy2, obtains TF from Policy2, and further generates DK based on TF and K, for example, DK=KDF (K, TF). Further, the in-vehicle device verifies the second verification information by using DK, and verifies the third verification information by using TF. Specifically, a process in which the in-vehicle device verifies the second verification information by using DK is as follows: The in-vehicle device generates one message authentication code by using DK and the ID of the vehicle and Nonce that are sent by the in-vehicle device to the second terminal device in S1001. The method for calculating the message authentication code is the same as a method for calculating the second verification information. If the message authentication code is the same as the second verification information, the in-vehicle device successfully verifies the second verification information. A process in which the in-vehicle device verifies the third verification information by using TF is similar to this process. Details are not described herein again. After the in-vehicle device successfully verifies the second verification information and the third verification information, the in-vehicle device controls the vehicle to start.

S1010: The in-vehicle device sends verification success information to the second terminal device.

S1011: The second terminal device deletes F1, F, and TF.

In this embodiment, the second terminal device of the vehicle renter generates the second verification information based on the authorization information of the vehicle owner, and generates the third verification information based on the second key generated by the second terminal device. Further, the second terminal device sends the second verification information and the third verification information to the in-vehicle device. After successfully verifying the second verification information and the third verification information, the in-vehicle device controls the vehicle to start, so that the vehicle owner can authorize, on the first terminal device, the vehicle renter to use the vehicle of the vehicle owner. This improves flexibility and convenience of the vehicle rental service.

The foregoing embodiments describe, by using the digital vehicle key as the symmetric key, the process of configuring the digital vehicle key, the process in which the vehicle owner controls the vehicle to start, the process in which the vehicle owner configures the authorization information for the another user, and the process in which the another user controls the vehicle based on the authorization information. The following embodiments describe, by using the digital vehicle key as the public key in the asymmetric keys, a process of configuring the digital vehicle key, a process in which the vehicle owner controls the vehicle to start, a process in which the vehicle owner configures authorization information for another user, and a process in which the another user controls the vehicle based on the authorization information.

Figure 11:
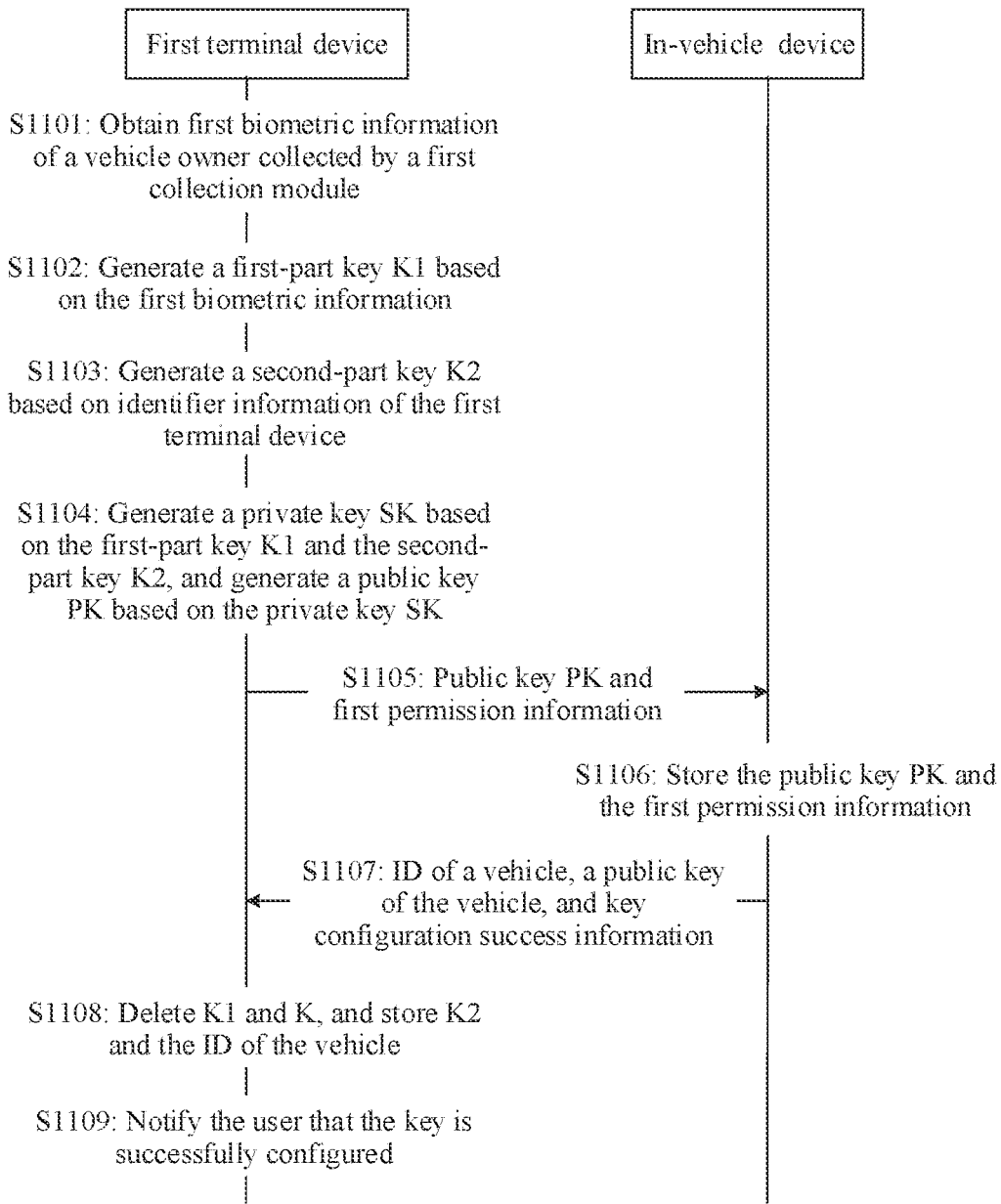
FIG. 11 is a flowchart of yet another vehicle control method according to an embodiment of this disclosure.

The following describes, by using a specific embodiment, the process of configuring the digital vehicle key when the digital vehicle key is the public key. Likewise, this configuration process generally needs to be performed once when the vehicle is delivered from a factory or when the vehicle owner purchases the vehicle. As shown in FIG. 11, the process specifically includes the following steps.

S1101: The first terminal device obtains the first biometric information of the vehicle owner collected by the first collection module.

S1102: The first terminal device generates the first-part key K1 based on the first biometric information.

S1103: The first terminal device generates the second-part key K2 based on the identifier information of the first terminal device.

S1104: The first terminal device generates the private key SK based on the first-part key K1 and the second-part key K2, and generates the public key PK based on the private key SK.

S1105: The first terminal device sends the public key PK and the first permission information to the in-vehicle device.

For example, the first terminal device may send the public key PK and the first permission information to the in-vehicle device through the secure channel.

The private key SK and the public key PK are a pair of asymmetric keys. The private key SK herein may be denoted as the first key. A decryption key corresponding to the private key SK, that is, the public key PK, may be used as the digital vehicle key. The first permission information herein is consistent with the foregoing first permission information. Details are not described herein again.

S1106: The in-vehicle device stores the public key PK and the first permission information.

S1107: The in-vehicle device sends the ID of the vehicle, a public key of the vehicle, and key configuration success information to the first terminal device.

For example, if an identity-based cryptography is used in this embodiment, the ID of the vehicle and the public key of the vehicle are the same. In this case, the in-vehicle device only needs to send the ID of the vehicle and the key configuration success information to the first terminal device. If an identity-based cryptography is not used in this embodiment, the ID of the vehicle and the public key of the vehicle are different. In this case, the in-vehicle device sends the ID of the vehicle, the public key of the vehicle, and the key configuration success information to the first terminal device. In addition, the public key of the vehicle may be specifically a public key of the in-vehicle device.

S1108: The first terminal device deletes K1 and K, and stores K2 and the ID of the vehicle.

S1109: The first terminal device notifies the user that the key is successfully configured.

In this embodiment, after the first terminal device sends the digital vehicle key to the in-vehicle device, the first terminal device deletes the first biometric information of the vehicle owner and the digital vehicle key. This can prevent the first biometric information of the vehicle owner from being stored in the first terminal device and the in-vehicle device, and reduce a risk of leaking the first biometric information of the vehicle owner.

Figure 12:
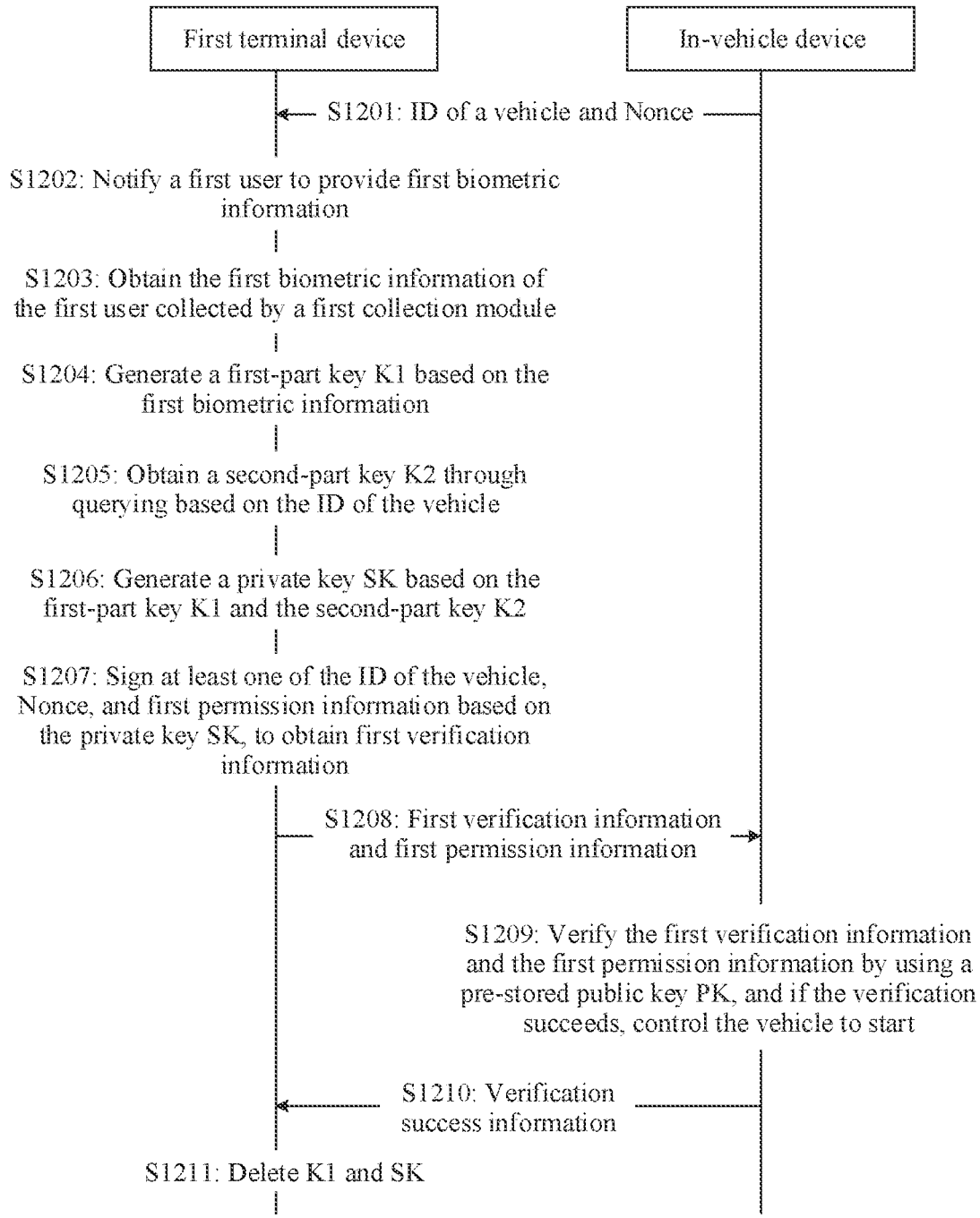
FIG. 12 is a flowchart of a yet another vehicle control method according to an embodiment of this disclosure.

With reference to a specific embodiment, the following describes the process in which the in-vehicle device controls, by using the pre-stored digital vehicle key, the vehicle to start. As shown in FIG. 12, the process specifically includes the following steps.

S1201: The in-vehicle device sends the ID of the vehicle and Nonce to the first terminal device.

For example, when the first terminal device of the vehicle owner is located in the preset area around the vehicle, the in-vehicle device of the vehicle sends the ID of the vehicle and Nonce to the first terminal device. Nonce herein is consistent with Nonce in the foregoing embodiment. Details are not described herein again.

S1202: The first terminal device notifies the first user to provide the first biometric information.

S1203: The first terminal device obtains the first biometric information of the first user collected by the first collection module.

S1204: The first terminal device generates the first-part key K1 based on the first biometric information.

S1205: The first terminal device obtains the second-part key K2 through querying based on the ID of the vehicle.

For example, in S1108, the first terminal device stores K2 and the ID of the vehicle. When receiving the ID of the vehicle, the first terminal device may obtain the second-part key K2 through querying based on the ID of the vehicle.

S1206: The first terminal device generates the private key SK based on the first-part key K1 and the second-part key K2.

S1207: The first terminal device signs at least one of the ID of the vehicle, Nonce, and the first permission information based on the private key SK, to obtain the first verification information.

For example, the first terminal device signs the ID of the vehicle, Nonce, and Policy 1 based on the private key SK. A specific signing process is as follows: The first terminal device may calculate a hash value of the ID, Nonce, and Policy1 by using a hash algorithm, and further encrypt the hash value by using the private key SK, so that an obtained ciphertext is a digital signature. The digital signature may be used as the first verification information. For example, the digital signature may be represented as SigSK (vehicle ID||Nonce||Policy1).

S1208: The first terminal device sends the first verification information and the first permission information to the in-vehicle device.

S1209: The in-vehicle device verifies the first verification information and the first permission information by using the pre-stored public key PK, and if the verification succeeds, controls the vehicle to start.

For example, after the in-vehicle device receives SigSK (vehicle ID‖Nonce‖Policy1) and Policy1, the in-vehicle device may decrypt the digital signature by using the pre-stored public key PK, to obtain one hash value. The hash value is denoted as a first hash value. Further, the in-vehicle device calculates, by using a hash algorithm the same as that of the first terminal device, the ID of the vehicle and Nonce that are sent by the in-vehicle device in S1201, and a hash value of Policy1 received by the in-vehicle device in S1208. The hash value is denoted as a second hash value. If the first hash value is the same as the second hash value, the in-vehicle device successfully verifies SigSK (vehicle ID‖Nonce‖Policy1) and Policy1. Further, the in-vehicle device controls the vehicle to start.

S1210: The in-vehicle device sends the verification success information to the first terminal device.

S1211: The first terminal device deletes K1 and SK.

Specifically, the first terminal device may delete the first biometric information of the vehicle owner collected by the first terminal device in S1203, the first-part key K1 generated by the first terminal device based on the first biometric information in S1204, and the private key SK generated by the first terminal device based on the first-part key K1 and the second-part key K2 in S1206. This avoids a risk of leaking the first biometric information of the vehicle owner. In addition, each time the vehicle owner controls the vehicle by using the first terminal device, the first terminal device needs to re-collect the biometric information of the vehicle owner and re-generate the private key SK. This prevents the private key SK from being stored in the first terminal device for a long time, and further improves vehicle security.

Figure 13:
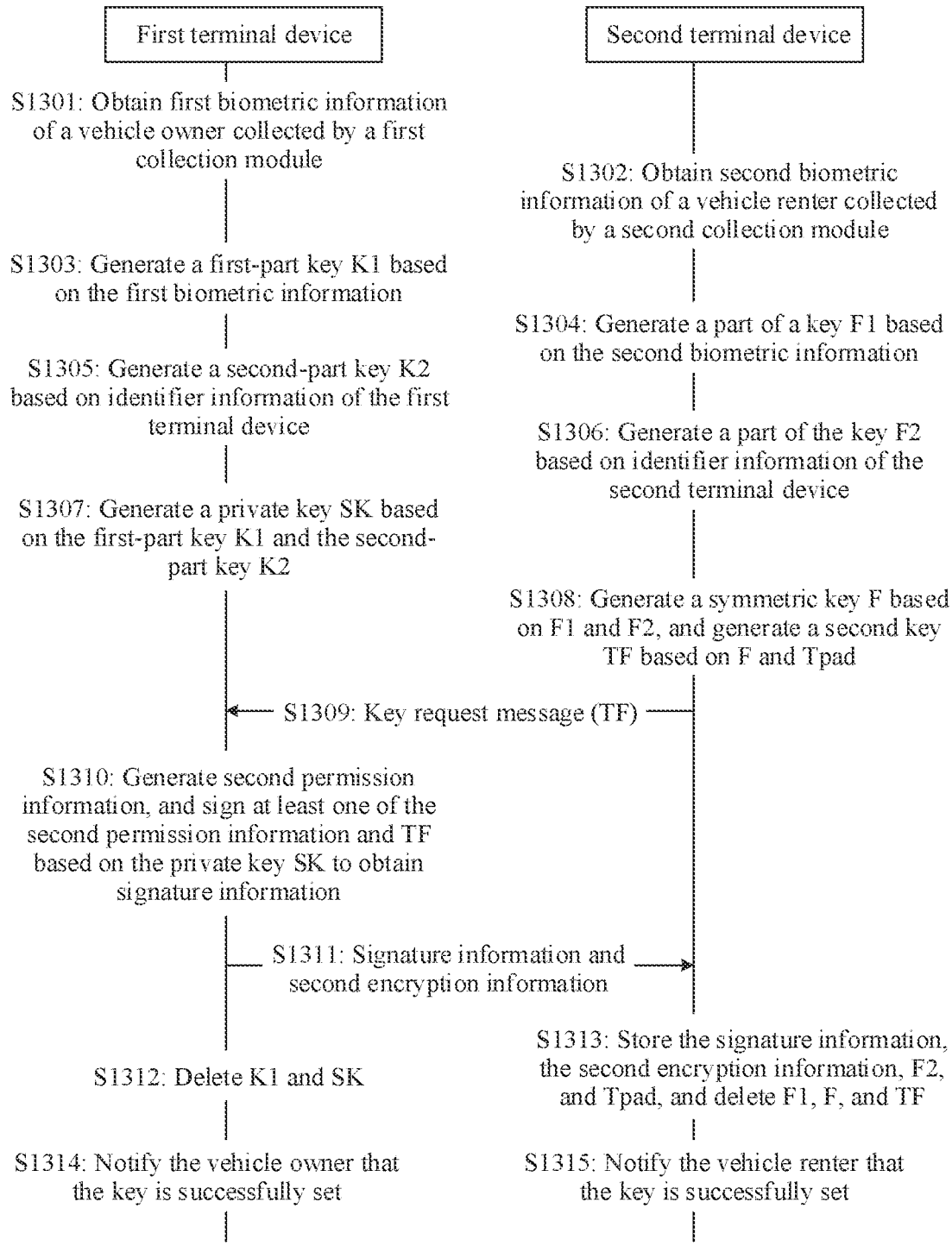
FIG. 13 is a flowchart of a yet another vehicle control method according to an embodiment of this disclosure.

The foregoing embodiments describe the process in which the vehicle owner configures the digital vehicle key (for example, the public key PK) for the in-vehicle device by using the first terminal device, and the process in which the vehicle owner controls, by using the first terminal device, the vehicle to start. In some other embodiments, the vehicle owner may further authorize, on the first terminal device, another user to use the vehicle of the vehicle owner. The following describes, by using an embodiment, the process in which the vehicle owner sends the authorization information to the second terminal device of the second user by using the first terminal device. The second user may be specifically a user that is authorized by the first user to control the vehicle, namely, the vehicle renter. As shown in FIG. 13, the process specifically includes the following steps.

S1301: The first terminal device obtains the first biometric information of the vehicle owner collected by the first collection module.

S1302: The second terminal device obtains the second biometric information of the vehicle renter collected by the second collection module.

For example, a biometric information collection module may also be disposed in the second terminal device of the vehicle renter. The biometric information collection module is configured to collect biometric information of the vehicle renter. Herein, the biometric information of the vehicle renter is denoted as the second biometric information, the second biometric information may be specifically information such as a fingerprint, an iris, a voiceprint, face information, or a gait of the vehicle renter. In addition, an execution sequence of S1301 and S1302 is not limited in this embodiment. Likewise, an execution sequence between S1303 and S1304, an execution sequence between S1305 and S1306, an execution sequence between S1307 and S1308, an execution sequence between S1312 and S1313, and an execution sequence between S1314 and S1315 are not limited in this embodiment.

S1303: The first terminal device generates the first-part key K1 based on the first biometric information.

S1304: The second terminal device generates the part of key F1 based on the second biometric information.

S1305: The first terminal device generates the second-part key K2 based on the identifier information of the first terminal device.

S1306: The second terminal device generates the part of key F2 based on identifier information of the second terminal device.

S1307: The first terminal device generates the private key SK based on the first-part key K1 and the second-part key K2.

S1308: The second terminal device generates the symmetric key F based on F1 and F2, and generates the second key TF based on F and Tpad.

For example, after the second terminal device generates the symmetric key F based on F1 and F2, the second terminal device may further generate Tpad. Tpad may be specifically a random number, a counter, or Nonce described above. Further, the second terminal device generates the second key TF based on F and Tpad, and TF may be represented as TF=KDF (Tpad, F).

S1309: The second terminal device sends the key request message to the first terminal device, where the key request message includes the second key TF.

For example, the second terminal device sends the key request message to the first terminal device through the secure channel.

S1310: The first terminal device generates the second permission information, and signs at least one of the second permission information and TF based on the private key SK to obtain the signature information.

After receiving the key request message sent by the second terminal device, the first terminal device may generate the second permission information for the vehicle renter based on the second key in the key request message. The second permission information is used to indicate the control permission of the vehicle renter on the vehicle of the vehicle owner. The second permission information includes the second key TF. For example, the second permission information may define which functions of the vehicle can be used by the vehicle renter, which modules of the vehicle can be controlled by the vehicle renter, a mileage that the vehicle renter can control the vehicle to drive, and time that the vehicle renter can control the vehicle. Specifically, the second permission information may be denoted as Policy2. Further, the first terminal device may sign at least one of the Policy2 or TF by using the private key SK, to obtain the signature information. The signature information may be used as the authorization information provided by the vehicle owner to the vehicle renter. The signature information is recorded as Token, for example, Token=SigSK (TF‖Policy2).

S1311: The first terminal device sends the signature information and second encryption information to the second terminal device.

The first terminal device may send the signature information and the second encryption information to the second terminal device through the secure channel. In this embodiment, the second encryption information is encryption information obtained by the first terminal device by encrypting Policy2 by using the public key of the vehicle. It may be understood that, in this embodiment, the first terminal device sends the second encryption information to the second terminal device, so that the second terminal device can send the second encryption information to the in-vehicle device, and the in-vehicle device decrypts the second encryption information based on the private key of the vehicle, to obtain the second key in the Policy2.

In some other embodiments, if the in-vehicle device may obtain the second key in another manner, for example, after the second terminal device sends the key request message to the first terminal device, the first terminal device sends the second key in the key request message to the in-vehicle device, the first terminal device may send the signature information to the second terminal device, but does not send second encryption information in S1311.

S1312: The first terminal device deletes K1 and SK.

S1313: The second terminal device stores the signature information, the second encryption information. F2, and Tpad, and deletes F1, F, and TF.

Specifically, the second terminal device may store a correspondence between the ID of the vehicle, the signature information, the second encryption information, F2, and Tpad.

S1314: The first terminal device notifies the vehicle owner that the key is successfully set.

S1315: The second terminal device notifies the vehicle renter that the key is successfully set.

In addition, in an alternative manner, at least one of the foregoing steps S1309, S1311, and S1313 may further include the ID of the vehicle. For example, in S1309, the second terminal device may further send, to the first terminal device, the ID of the vehicle that the vehicle renter requests to rent. In S1311, the first terminal device sends the ID of the vehicle, the second verification information, and the encryption information to the second terminal device. In S1313, the second terminal device stores the ID of the vehicle, the second verification information, the encryption information. F2, and Tpad, and deletes F1. F, and TF.

In this embodiment, the first terminal device of the vehicle owner sends the authorization information to the second terminal device of the vehicle renter, so that the vehicle owner can authorize, on the first terminal device, the vehicle renter to use the vehicle of the vehicle owner. Compared with a solution in which the vehicle renter needs to obtain a physical vehicle key from the vehicle owner, and after using the vehicle, the vehicle renter needs to return the physical vehicle key to the vehicle owner, this solution improves flexibility and convenience of the vehicle rental service. In addition, in the process in which the vehicle owner authorizes, on the first terminal device, the vehicle renter to use the vehicle of the vehicle owner, configuration does not need to be performed on the in-vehicle device. This further improves convenience of the vehicle rental service. In addition, the vehicle owner may further generate the permission information for the vehicle renter, to limit the permission of the vehicle renter to control the vehicle. This further improves vehicle security and flexibility of the vehicle rental service.

Figure 14:
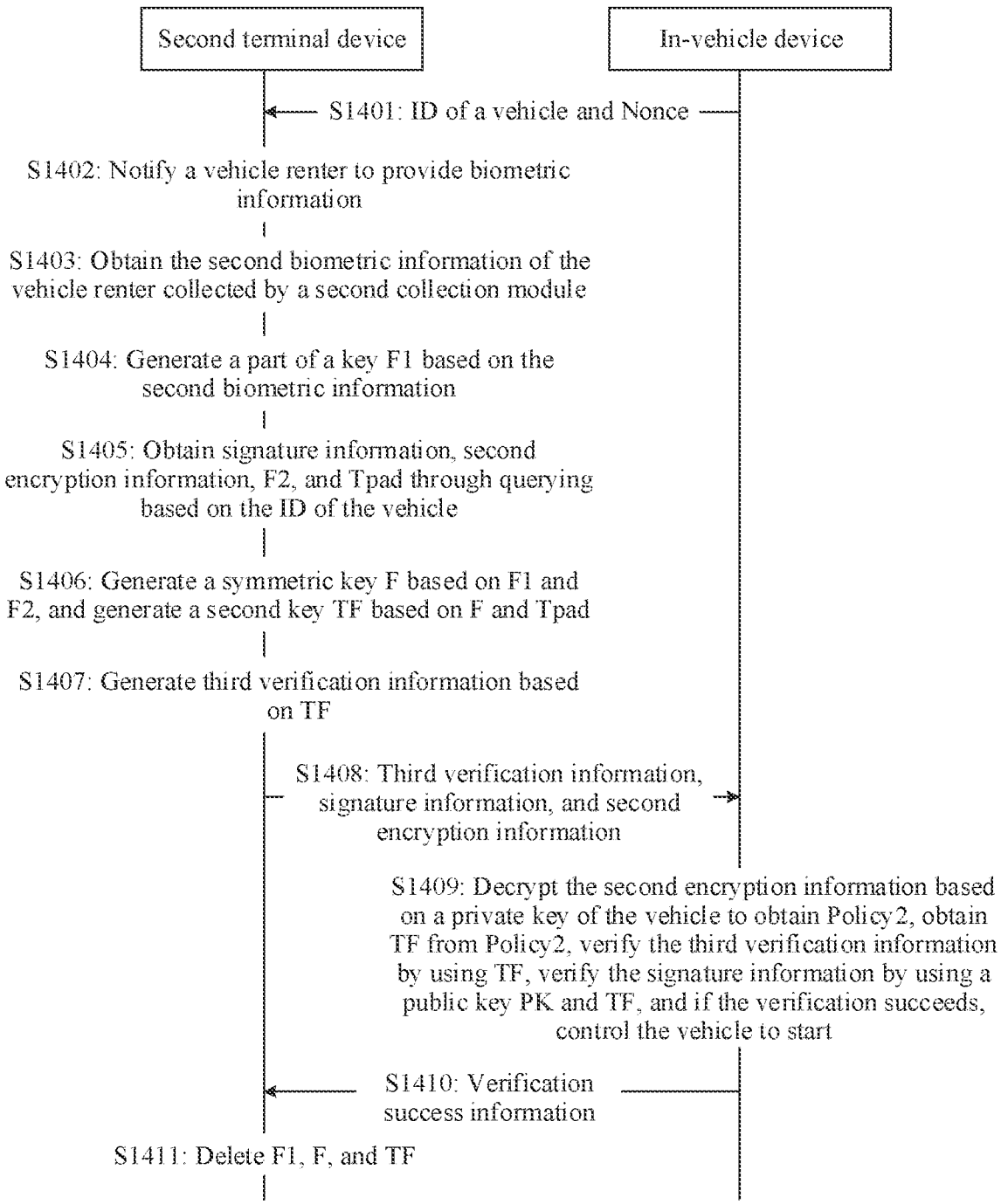
FIG. 14 is a flowchart of a yet another vehicle control method according to an embodiment of this disclosure.

The following describes, with reference to a specific embodiment, a process in which the vehicle renter controls the vehicle based on the authorization information from the vehicle owner. As shown in FIG. 14, the process specifically includes the following steps.

S1401: The in-vehicle device sends the ID of the vehicle and Nonce to the second terminal device.

For example, when the vehicle renter carrying the second terminal device is located around the vehicle rent by the vehicle renter, the in-vehicle device of the vehicle sends the ID of the vehicle and Nonce to the second terminal device.

S1402: The second terminal device notifies the vehicle renter to provide the biometric information.

For example, the second terminal device may notify, by using a text, a voice, interface display content, or the like, the vehicle renter to provide the biometric information.

S1403: The second terminal device obtains the second biometric information of the vehicle renter collected by the second collection module.

S1404: The second terminal device generates the part of key F1 based on the second biometric information.

S1405: The second terminal device obtains the signature information, the second encryption information, F2, and Tpad through querying based on the ID of the vehicle.

For example, in S1313, the second terminal device may store the correspondence between the ID of the vehicle, the signature information, the second encryption information. F2, and Tpad. When the second terminal device receives the ID of the vehicle sent by the in-vehicle device, the second terminal device may obtain the signature information, the second encryption information, F2, and Tpad through querying based on the ID of the vehicle.

S1406: The second terminal device generates the symmetric key F based on F1 and F2, and generates the second key TF based on F and Tpad.

For example, TF=KDF (Tpad, F).

S1407: The second terminal device generates the to-be-verified third verification information based on TF.

For example, the second terminal device generates the third verification information based on TF, the ID of the vehicle, and Nonce, and the third verification information may be represented as HMAC (TF, vehicle ID||Nonce).

S1408: The second terminal device sends the third verification information, the signature information, and the second encryption information to the in-vehicle device.

S1409: The in-vehicle device decrypts the second encryption information based on the private key of the vehicle to obtain Policy2, obtains TF from Policy2, verifies the third verification information by using TF, verifies the signature information by using the public key PK and TF, and if the third verification information and the signature information are successfully verified, controls the vehicle to start.

In this embodiment, the signature information may be the second verification information.

For example, the in-vehicle device decrypts the second encryption information by using the private key of the vehicle to obtain Policy2, obtains TF from Policy2, and verifies the third verification information by using TF. Specifically, a process in which the in-vehicle device verifies the third verification information by using TF is as follows: The in-vehicle device generates one message authentication code by using TF and the ID of the vehicle and Nonce that are sent by the in-vehicle device to the second terminal device in S1401. A method for calculating the message authentication code is the same as a method for calculating the third verification information. If the message authentication code is the same as the third verification information received by the in-vehicle device in S1408, the in-vehicle device successfully verifies the third verification information. Further, the in-vehicle device verifies the signature information by using the public key PK and TF. For example, the in-vehicle device decrypts the signature information by using the public key PK to obtain one hash value, and herein the hash value is recorded as the first hash value. Further, the in-vehicle device calculates, by using a hash algorithm. Policy2 obtained by the in-vehicle device by decrypting the second encryption information and a hash value of TF included in the Policy2. The hash value is denoted as the second hash value. The hash algorithm used by the in-vehicle device is the same as the hash algorithm used by the first terminal device to calculate Token=SigSK (TF∥Policy2). If the first hash value is the same as the second hash value, the in-vehicle device successfully verifies the signature information. After the in-vehicle device successfully verifies the third verification information and the signature information, the in-vehicle device controls the vehicle to start.

S1410: The in-vehicle device sends the verification success information to the second terminal device.

S1411: The second terminal device deletes F1, F, and TF.

In this embodiment, the second terminal device of the vehicle renter generates the third verification information based on the second key generated by the second terminal device, and uses the authorization information of the vehicle owner, namely, the signature information, as the second verification information. Further, the second terminal device sends the third verification information and the second verification information to the in-vehicle device. After successfully verifying the third verification information and the second verification information, the in-vehicle device controls the vehicle to start, so that the vehicle owner can authorize, on the first terminal device, the vehicle renter to use the vehicle of the vehicle owner. This improves flexibility and convenience of the vehicle rental service.

It may be understood that the processes shown in FIG. 9, FIG. 10, FIG. 13, and FIG. 14 may also be applicable to a scenario in which the vehicle owner authorizes a family member, a friend, and a relative of the vehicle owner to use the vehicle, so that the vehicle owner can flexibly manage and authorize another person to use the vehicle.

It may be understood that some or all of the steps or operations in the foregoing embodiments are merely examples. Other operations or variations of various operations may be performed in embodiments of this disclosure. In addition, the steps may be performed in a sequence different from that presented in the foregoing embodiments, and not all operations in the foregoing embodiments may need to be performed.

It may be understood that in the foregoing embodiments, an operation or a step implemented by the first terminal device may also be implemented by a component (for example, a chip or a circuit) that can be used in the first terminal device, an operation or a step implemented by the second terminal device may also be implemented by a component (for example, a chip or a circuit) that can be used in the second terminal device, and an operation or a step implemented by the in-vehicle device may also be implemented by a component (for example, a chip or a circuit) that can be used in the in-vehicle device.

Figure 15:
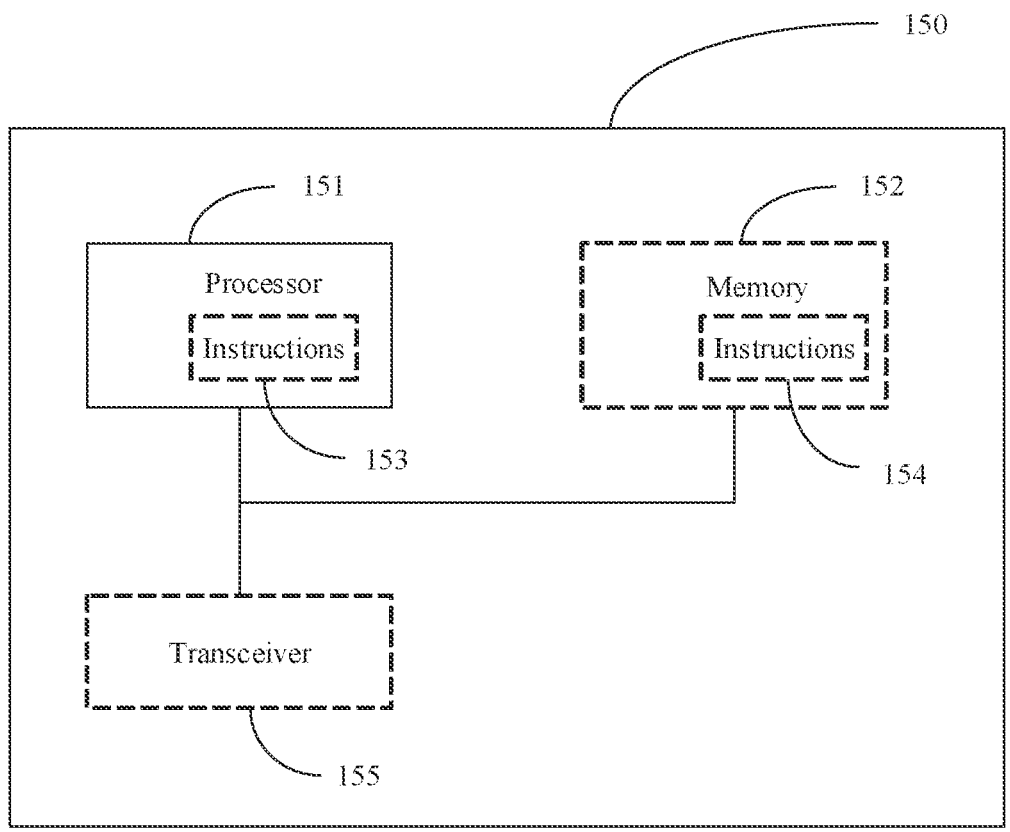
FIG. 15 is a schematic diagram of a structure of a communications apparatus according to an embodiment of this disclosure.

FIG. 15 is a schematic diagram of a structure of a communications apparatus. The communications apparatus may be configured to implement the method corresponding to the terminal device (for example, the first terminal device or the second terminal device) or the method corresponding to the in-vehicle device described in the foregoing method embodiments. For details, refer to the descriptions in the foregoing method embodiments.

The communications apparatus 150 may include one or more processors 151. The processor 151 may also be referred to as a processing unit, and may implement a specific control function. The processor 151 may be a general-purpose processor, a special-purpose processor, or the like.

In an optional design, the processor 151 may alternatively store instructions 153, and the instructions may be run by the processor, so that the communications apparatus 150 performs the method corresponding to the first terminal device, the second terminal device, or the in-vehicle device described in the foregoing method embodiments.

In another possible design, the communications apparatus 150 may include a circuit. The circuit may implement a sending, receiving, or communications function in the foregoing method embodiments.

Optionally, the communications apparatus 150 may include one or more memories 152. The memory stores instructions 154 or intermediate data. The instructions 154 may be run on the processor, so that the communications apparatus 150 performs the method in the foregoing method embodiments. Optionally, the memory may further store other related data. Optionally, the processor may also store instructions and/or data. The processor and the memory may be separately disposed, or may be integrated together.

Optionally, the communications apparatus 150 may further include a transceiver 155.

The processor 151 may be referred to as a processing unit. The transceiver 155 may be referred to as a transceiver unit, a transceiver machine, a transceiver circuit, a transceiver, or the like, and is configured to implement a transceiver function of the communications apparatus.

If the communications apparatus is configured to implement an operation corresponding to the first terminal device in the embodiment shown in FIG. 5, for example, the transceiver may send first verification information to an in-vehicle device, the transceiver may further complete another corresponding communication function. The processor is configured to complete a corresponding determining or control operation, and optionally, may further store corresponding instructions in the memory. For a specific processing manner of each component, refer to related descriptions in the foregoing embodiments.

If the communications apparatus is configured to implement an operation corresponding to the in-vehicle device in FIG. 5, for example, the transceiver may receive first verification information from a first terminal device, the transceiver may further complete another corresponding communication function. The processor is configured to complete a corresponding determining or control operation, and optionally, may further store corresponding instructions in the memory. For a specific processing manner of each component, refer to related descriptions in the foregoing embodiments.

If the communications apparatus is configured to implement an operation corresponding to the second terminal device in the embodiment shown in FIG. 10, the processor is configured to generate a part of the key F1 based on second biometric information, and the transceiver is configured to send a message authentication code 1, a message authentication code 2, and encryption information to the in-vehicle device. Optionally, the transceiver may be configured to complete another related communication operation, and the processor may be configured to complete another corresponding determining or control operation, for example, determine information about at least one cell. Optionally, the memory may further store corresponding instructions. For a specific processing manner of each component, refer to related descriptions in the foregoing embodiments.

The processor and the transceiver in this disclosure may be implemented in an integrated circuit (IC), an analog IC, a radio frequency integrated circuit RFIC, a mixed signal IC, an disclosure-specific integrated circuit (disclosureASIC), a printed circuit board (PCB), an electronic device, or the like. The processor and the transceiver may also be manufactured by using various IC technologies, for example, a complementary metal oxide semiconductor (CMOS), an n-type metal oxide semiconductor (NMOS), a P-channel metal oxide semiconductor (PMOS), a bipolar junction transistor (BJT), a bipolar CMOS (BiCMOS), silicon germanium (SiGe), and gallium arsenide (GaAs).

Optionally, the communications apparatus may be an independent device or may be a part of a large device. For example, the device may be:

(1) an independent integrated circuit IC, a chip, or a chip system or subsystem;
(2) a set of one or more ICs, where optionally, the IC set may further include a storage component configured to store data and/or instructions;
(3) an ASIC, for example, a modem (MSM);
(4) a module that can be embedded in another device:
(5) a receiver, a terminal device, a cellular phone, a wireless device, a handheld phone, a mobile unit, or a network device; or
(6) another device or the like.

Figure 16:
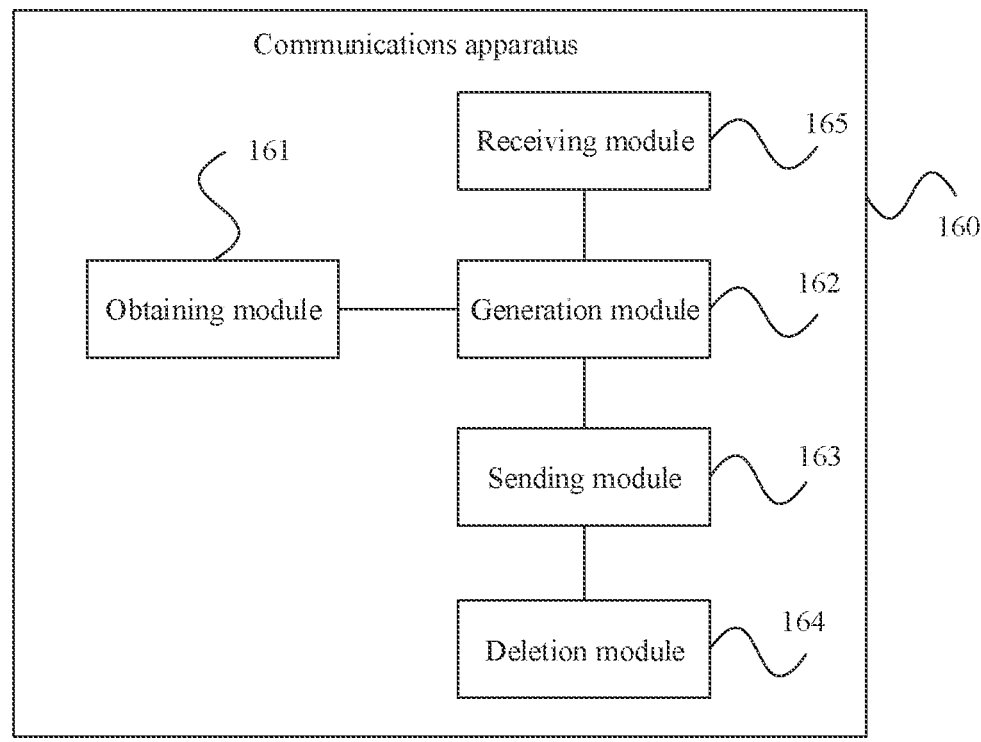
FIG. 16 is a schematic diagram of a structure of a communications apparatus according to an embodiment of this disclosure.

FIG. 16 is a schematic diagram of a structure of a communications apparatus according to an embodiment of this disclosure. As shown in FIG. 16, the communications apparatus 160 includes an obtaining module 161, a generation module 162, and a sending module 163. The obtaining module 161 is configured to obtain first biometric information of a first user collected by a first collection module. The generation module 162 is configured to: generate a first key based on the first biometric information and identifier information of a first terminal device; and generate to-be-verified first verification information based on the first key. The sending module 163 is configured to send the first verification information to an in-vehicle device. The in-vehicle device is configured to: verify the first verification information by using a preset digital vehicle key, and if the verification succeeds, control a vehicle to start.

Optionally, the first collection module includes a biometric information collection module.

Optionally, when generating the first key based on the first biometric information and the identifier information of the first terminal device, the generation module 162 is specifically configured to: generate a first-part key based on the first biometric information; generate a second-part key based on the identifier information of the first terminal device; and generate the first key based on the first-part key and the second-part key.

Optionally, the digital vehicle key is obtained based on the first biometric information of the first user and the identifier information of the first terminal device.

Optionally, before the obtaining module 161 obtains the first biometric information of the first user collected by the first collection module, the obtaining module 161 is further configured to obtain the first biometric information of the first user collected by the first collection module. The generation module 162 is further configured to generate the digital vehicle key based on the first biometric information and the identifier information of the first terminal device.

The sending module 163 is further configured to send the digital vehicle key to the in-vehicle device.

Optionally, the communications apparatus 160 further includes a deletion module 164. After the sending module 163 sends the digital vehicle key to the in-vehicle device, and/or after the sending module 163 sends the first verification information to the in-vehicle device, the deletion module 164 is configured to delete the first biometric information and the first key.

Optionally, when generating the to-be-verified first verification information based on the first key, the generation module 162 is specifically configured to: generate the to-be-verified first verification information based on the first key and at least one of the identifier information of the vehicle, random information generated by the in-vehicle device, and first permission information, where the first permission information is permission information generated by the first terminal device for the first user to control the vehicle.

Optionally, the communications apparatus 160 further includes a receiving module 165. Before the generation module 162 generates the to-be-verified first verification information based on the first key, the receiving module is configured to receive the identifier information of the vehicle from the in-vehicle device and/or the random information generated by the in-vehicle device.

Optionally, when generating the to-be-verified first verification information based on the first key and the at least one of the identifier information of the vehicle, the random information generated by the in-vehicle device, and the first permission information, the generation module 162 is specifically configured to generate the to-be-verified first verification information based on the first key and the first permission information. When sending the first verification information to the in-vehicle device, the sending module 163 is specifically configured to send the first verification information and the first permission information to the in-vehicle device.

Optionally, the digital vehicle key is an asymmetric key of the first key; and when generating the to-be-verified first verification information based on the first key and the at least one of the identifier information of the vehicle, the random information generated by the in-vehicle device, and the first permission information, the generation module 162 is specifically configured to sign the at least one of the identifier information of the vehicle, the random information generated by the in-vehicle device, and the first permission information based on the first key, to obtain the to-be-verified first verification information.

Optionally, when the digital vehicle key is a symmetric key of the first key, when generating the to-be-verified first verification information based on the first key and the at least one of the identifier information of the vehicle, the random information generated by the in-vehicle device, and the first permission information, the generation module 162 is specifically configured to generate the to-be-verified first verification information based on HMAC (K, M), where K represents the first key, and M represents the at least one of the identifier information of the vehicle, the random information generated by the in-vehicle device, and the first permission information.

Optionally, the receiving module 165 is further configured to receive a second key from a second terminal device of a second user, where the second key is generated based on second biometric information of the second user and identifier information of the second terminal device. The generation module 162 is further configured to generate authorization information based on the first key and the second key. The sending module 163 is further configured to send the authorization information to the second terminal device, where the authorization information is used by the second terminal device to generate to-be-verified second verification information, and the second verification information is sent to the in-vehicle device to perform identity authentication on the second terminal device.

Optionally, the second key is sent to the in-vehicle device, and the digital vehicle key and the second key are used by the in-vehicle device to perform identity authentication on the second terminal device.

Optionally, when the digital vehicle key is a symmetric key of the first key, the authorization information includes a third key, and the third key is generated based on the first key and the second key; or when the digital vehicle key is an asymmetric key of the first key, the authorization information includes signature information, the signature information is information obtained by signing at least one of second permission information and the second key based on the first key, the second permission information includes the second key, and the second permission information is permission information that is used for the second user to control the vehicle and is generated by the first terminal device based on the second key after the first terminal device receives the second key from the second terminal device.

Optionally, when the digital vehicle key is the symmetric key of the first key, when sending the authorization information to the second terminal device, the sending module 163 is specifically configured to send the authorization information and first encryption information to the second terminal device, where the first encryption information is information obtained by encrypting the second permission information based on the first key.

Optionally, when the digital vehicle key is the asymmetric key of the first key, when sending the authorization information to the second terminal device, the sending module 163 is specifically configured to send the authorization information and second encryption information to the second terminal device, where the second encryption information is information obtained by encrypting the second permission information based on a public key of the vehicle.

Optionally, the sending module 163 is further configured to send the second key to the in-vehicle device. The communications apparatus in the embodiment shown in FIG. 16 may be configured to perform the technical solutions in the foregoing method embodiments. For an implementation principle and a technical effect thereof, further refer to related descriptions in the method embodiments. Optionally, the communications apparatus may be the first terminal device, or may be a component (for example, a chip or a circuit) of the first terminal device.

Figure 17:
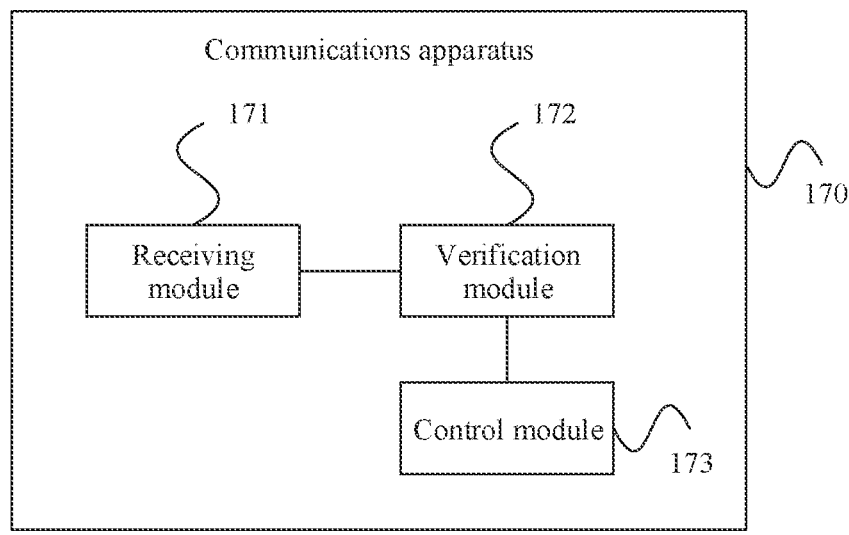
FIG. 17 is a schematic diagram of a structure of another communications apparatus according to an embodiment of this disclosure.

FIG. 17 is a schematic diagram of a structure of another communications apparatus according to an embodiment of this disclosure. As shown in FIG. 17, the communications apparatus 170 includes a receiving module 171, a verification module 172, and a control module 173. The receiving module 171 is configured to receive to-be-verified first verification information from a first terminal device, where the first verification information is generated by the first terminal device based on a first key, and the first key is generated by the first terminal device based on first biometric information of a first user and identifier information of the first terminal device. The verification module 172 is configured to verify the first verification information by using a preset digital vehicle key. The control module 173 is configured to: if the verification module successfully verifies the first verification information, control a vehicle to start, where the digital vehicle key is obtained based on the first biometric information of the first user and the identifier information of the first terminal device.

Optionally, the receiving module 171 is further configured to: receive second verification information and third verification information from a second terminal device of a second user, where the second verification information is generated based on authorization information that is received by the second terminal device from the first terminal device, the third verification information is generated based on a second key, and the second key is generated based on second biometric information of the second user and identifier information of the second terminal device. The verification module is further configured to verify the second verification information and the third verification information. If the verification module successfully verifies the second verification information and third verification information, the control module controls the vehicle to start.

The communications apparatus in the embodiment shown in FIG. 17 may be configured to perform the technical solutions in the foregoing method embodiments. For an implementation principle and a technical effect thereof, further refer to related descriptions in the method embodiments. Optionally, the communications apparatus may be an in-vehicle device, or may be a component (for example, a chip or a circuit) of the in-vehicle device.

Figure 18:
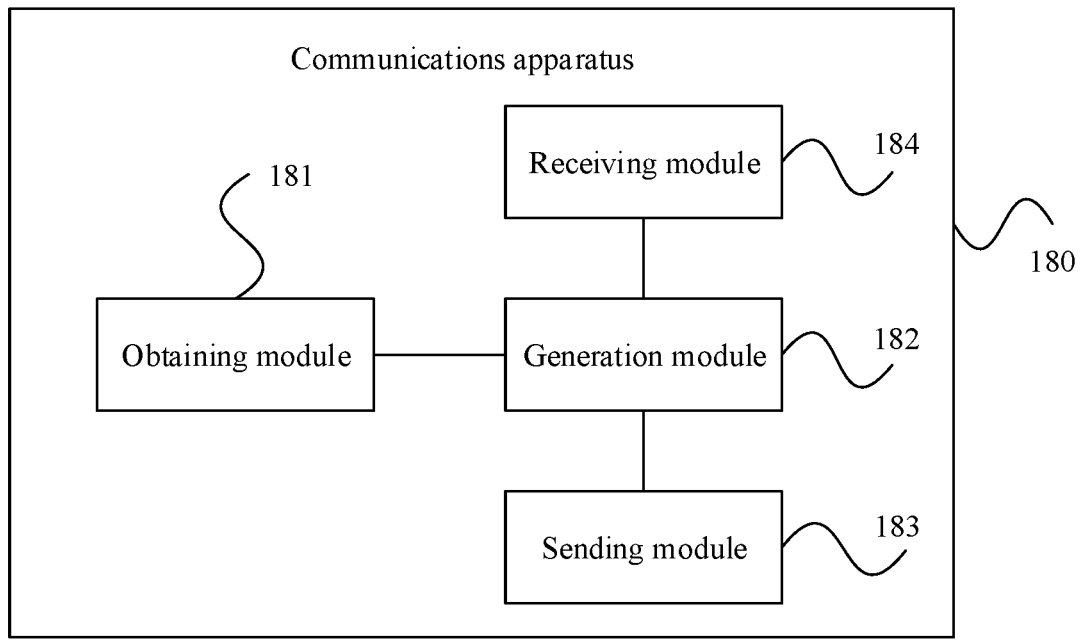
FIG. 18 is a schematic diagram of a structure of another communications apparatus according to an embodiment of this disclosure.

FIG. 18 is a schematic diagram of a structure of another communications apparatus according to an embodiment of this disclosure. As shown in FIG. 18, the communications apparatus 180 includes an obtaining module 181, a generation module 182, a sending module 183, and a receiving module 184. The obtaining module 181 is configured to obtain second biometric information of a second user collected by a second collection module. The generation module 182 is configured to generate a second key based on the second biometric information and identifier information of the second terminal device. The sending module 183 is configured to send the second key to a first terminal device of a first user. The receiving module 184 is configured to receive authorization information from the first terminal device, where the authorization information is generated based on a first key and the second key, and the first key is generated based on first biometric information of the first user and identifier information of the first terminal device. The generation module 182 is further configured to: generate to-be-verified second verification information based on the authorization information, and generate to-be-verified third verification information based on the second key. The sending module 183 is further configured to: send the second verification information and the third verification information to an in-vehicle device, where the in-vehicle device is configured to: receive the second key, verify the third verification information based on the second key, verify the second verification information based on a preset digital vehicle key and the second key, and if the verification succeeds, control a vehicle to start, where the digital vehicle key is obtained based on the first biometric information of the first user and the identifier information of the first terminal device.

Optionally, the second collection module includes a biometric information collection module.

Optionally, when the digital vehicle key is a symmetric key of the first key, the authorization information includes a third key, and the third key is generated based on the first key and the second key.

Optionally, when the digital vehicle key is an asymmetric key of the first key, the authorization information includes signature information, the signature information is information obtained by signing at least one of second permission information and the second key based on the first key, the second permission information includes the second key, and the second permission information is permission information that is used for the second user to control the vehicle and is generated by the first terminal device based on the second key after the first terminal device receives the second key from the second terminal device.

Optionally, when the digital vehicle key is the symmetric key of the first key, when receiving the authorization information from the first terminal device, the receiving module 184 is specifically configured to receive the authorization information and first encryption information from the first terminal device, where the first encryption information is information obtained by encrypting the second permission information based on the first key.

Optionally, when the digital vehicle key is the symmetric key of the first key, when receiving the authorization information from the first terminal device, the receiving module 184 is specifically configured to receive the authorization information and second encryption information from the first terminal device, where the second encryption information is information obtained by encrypting the second permission information based on a public key of the vehicle.

The communications apparatus in the embodiment shown in FIG. 18 may be configured to perform the technical solutions in the foregoing method embodiments. For an implementation principle and a technical effect thereof, further refer to related descriptions in the method embodiments. Details are not described herein again. Optionally, the communications apparatus may be the second terminal device, or may be a component (for example, a chip or a circuit) of the second terminal device.

Figure 19:
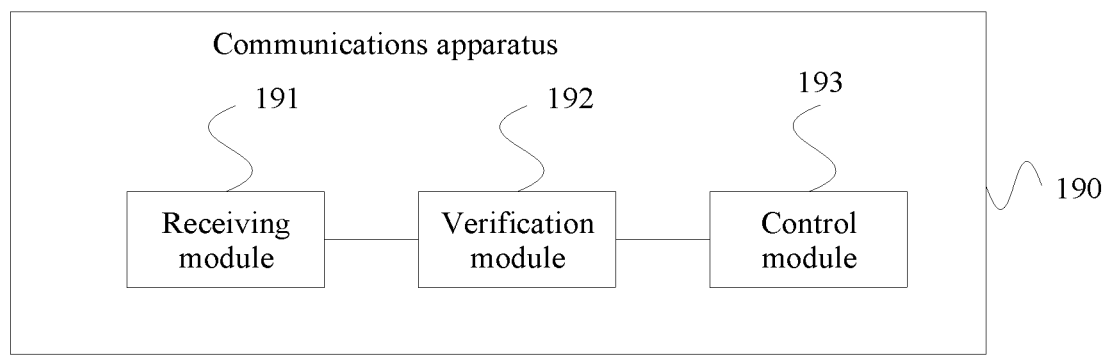
FIG. 19 is a schematic diagram of a structure of another communications apparatus according to an embodiment of this disclosure.

FIG. 19 is a schematic diagram of a structure of another communications apparatus according to an embodiment of this disclosure. As shown in FIG. 19, the communications apparatus 190 includes a receiving module 191, a verification module 192, and a control module 193. The receiving module 191 is configured to: receive second verification information and third verification information from a second terminal device of a second user, where the second verification information is generated based on authorization information received by the second terminal device from a first terminal device of a first user, the third verification information is generated based on a second key, the authorization information is generated based on a first key and the second key, the first key is generated based on first biometric information of the first user and identifier information of the first terminal device, and the second key is generated based on second biometric information of the second user and identifier information of the second terminal device; and receive the second key. The verification module 192 is configured to: verify the third verification information based on the second key, and verify the second verification information based on a preset digital vehicle key and the second key. The control module 193 is configured to: if the verification module successfully verifies the second verification information and the third verification information, control a vehicle to start, where the digital vehicle key is obtained based on the first biometric information of the first user and the identifier information of the first terminal device.

Optionally, when the digital vehicle key is a symmetric key of the first key, the authorization information includes a third key, and the third key is generated based on the first key and the second key.

Optionally, when the digital vehicle key is an asymmetric key of the first key, the authorization information includes signature information, the signature information is information obtained by signing at least one of second permission information and the second key based on the first key, the second permission information includes the second key, and the second permission information is permission information that is used for the second user to control the vehicle and is generated by the first terminal device based on the second key after the first terminal device receives the second key from the second terminal device.

Optionally, when receiving the second key, the receiving module 191 is specifically configured to receive the second key from the first terminal device.

Optionally, when receiving the second key, the receiving module 191 is specifically configured to receive first encryption information from the second terminal device, where the first encryption information is information obtained by encrypting second permission information based on the first key, and the second permission information includes the second key.

Optionally, when receiving the second key, the receiving module 191 is specifically configured to receive second encryption information from the second terminal device, where the second encryption information is information obtained by encrypting the second permission information based on a public key of the vehicle.

The communications apparatus in the embodiment shown in FIG. 19 may be configured to perform the technical solution in the foregoing method embodiment. An implementation principle and a technical effect thereof are similar to those of the method embodiment. Details are not described herein again. The communications apparatus may be an in-vehicle device, or may be a component (for example, a chip or a circuit) of an in-vehicle device.

It should be understood that division into the foregoing modules of the communications apparatus shown in FIG. 16 to FIG. 19 is merely logical function division. In actual implementation, some or all of the modules may be integrated into one physical entity, or may be physically separated. In addition, all of the modules may be implemented in a form of software invoked by a processor element or in a form of hardware. Alternatively, some of the modules may be implemented in a form of software invoked by a processor element, and some modules may be implemented in a form of hardware. For example, the verification module may be an independently disposed processor element, or may be integrated into a communications apparatus, for example, a chip of an in-vehicle device for implementation. In addition, the verification module may be stored in a memory of the communications apparatus in a form of a program to be invoked by a processor element of the communications apparatus to perform a function of each of the foregoing modules. An implementation of another module is similar to the implementation of the verification module. In addition, some or all of these modules may be integrated together, or may be implemented independently. The processor element described herein may be an integrated circuit, and has a signal processing capability. In an implementation process, steps in the foregoing methods or the foregoing modules can be implemented by using a hardware integrated logic circuit in the processor element, or by using instructions in a form of software.

For example, the foregoing modules may be configured as one or more integrated circuits for implementing the foregoing method, for example, one or more disclosure-specific integrated circuits (Disclosure ASICs), one or more microprocessors (digital signal processors, DSPs), or one or more field programmable gate arrays (FPGAs). For another example, when one of the foregoing modules is implemented in a form of scheduling a program by a processor element, the processor element may be a general-purpose processor, for example, a central processing unit (CPU) or another processor that can invoke the program. For another example, these modules may be integrated together and implemented in a form of a system-on-a-chip (SOC).

Figure 20:
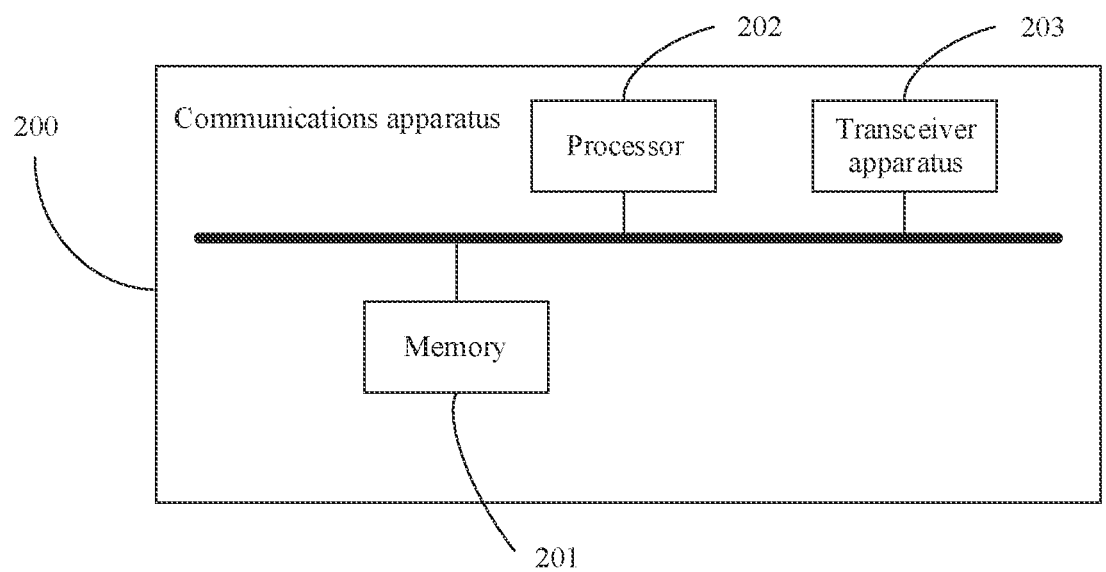
FIG. 20 is a schematic diagram of a structure of still another communications apparatus according to an embodiment of this disclosure.

FIG. 20 is a schematic diagram of a structure of still another communications apparatus according to an embodiment of this disclosure. As shown in FIG. 20, the communications apparatus 200 includes a processor 202 and a transceiver apparatus 203. The transceiver apparatus 203 may alternatively be a transceiver. The communications apparatus in the embodiment shown in FIG. 20 may be configured to perform the technical solutions in the foregoing method embodiments. For an implementation principle and a technical effect thereof, further refer to related descriptions in the method embodiments. Details are not described herein again. The communications apparatus may be a terminal device (for example, a first terminal device or a second terminal device), or may be a component (for example, a chip or a circuit) of the terminal device. Alternatively, the communications apparatus may be an in-vehicle device, or may be a component (for example, a chip or a circuit) of the in-vehicle device.

When the communications apparatus is the first terminal device, the processor 202 may be configured to implement corresponding functions of the generation module 162 of the communications apparatus shown in FIG. 16, and the transceiver apparatus 203 is configured to implement corresponding functions of the receiving module 165 and the sending module 163 of the communications apparatus shown in FIG. 16.

When the communications apparatus is the in-vehicle device, the processor 202 may be configured to implement corresponding functions of the verification module 172 of the communications apparatus shown in FIG. 17, and the transceiver apparatus 203 is configured to implement corresponding functions of the receiving module 171 of the communications apparatus shown in FIG. 17.

When the communications apparatus is the second terminal device, the processor 202 may be configured to implement corresponding functions of the generation module 182 of the communications apparatus shown in FIG. 18, and the transceiver apparatus 203 is configured to implement corresponding functions of the sending module 183 of the communications apparatus shown in FIG. 18.

Alternatively, some or all of the foregoing modules may be implemented in a form of an integrated circuit that is embedded in a chip of the terminal device. In addition, the modules may be separately implemented, or may be integrated together. The foregoing modules may be configured as one or more integrated circuits for implementing the foregoing method, for example, one or more disclosure-specific integrated circuits (DisclosureASICs), one or more microprocessors (digital signal processors, DSPs), or one or more field programmable gate arrays (FPGAs).

An embodiment of this disclosure further provides a computer-readable storage medium, including computer programs or instructions. When the computer programs or the instructions are run on a computer, the vehicle control method in the foregoing embodiment is performed.

In addition, an embodiment of this disclosure further provides a computer program including programs or instructions. When the programs or instructions are run on a computer, the vehicle control method in the foregoing embodiment is performed.

Optionally, some or all of the computer programs may be stored in a storage medium encapsulated with a processor, or may be stored in a memory that is not encapsulated with a processor.

In addition, an embodiment of this disclosure further provides a computer program product. The computer program product includes computer programs or instructions. When the computer programs or instructions are run on a computer, the vehicle control method in the foregoing embodiment is performed.

In addition, an embodiment of this disclosure further provides a processor. The processor includes at least one circuit, configured to perform the vehicle control method in the foregoing embodiments.

In addition, an embodiment of this disclosure further provides a system. The system includes the foregoing terminal device (for example, the first terminal device and/or the second terminal device) and in-vehicle device.

All or some of foregoing embodiments may be implemented by using software, hardware, firmware, or any combination thereof. When software is used to implement embodiments, some or all of embodiments may be implemented in a form of a computer program product. The computer program product includes one or more computer instructions. When the computer program instructions are loaded and executed on the computer, some or all of the procedures or functions in this disclosure are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Figure 21:
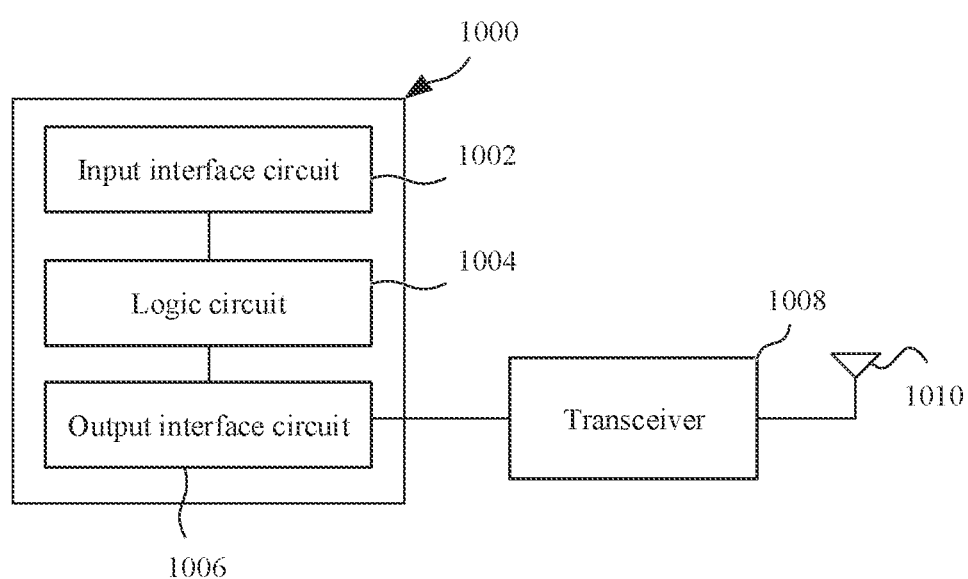
FIG. 21 is a schematic diagram of a structure of still another communications apparatus according to an embodiment of this disclosure.

On the basis of a same inventive concept as the method provided in the foregoing embodiments of this disclosure, an embodiment of this disclosure further provides a communications apparatus, configured to implement the method in the foregoing embodiments. The communications apparatus may be a first terminal device, a second terminal device, or an in-vehicle device, or may be a component (for example, a chip or a circuit) of the first terminal device, the second terminal device, or the in-vehicle device. Some or all of the methods in the foregoing embodiments may be implemented by hardware or may be implemented by software. When the methods are implemented by hardware, refer to FIG. 21. The communications apparatus 1000 includes an input interface circuit 1002, a logic circuit 1004, and an output interface circuit 1006. In addition, the communications apparatus 1000 further includes a transceiver 1008 and an antenna 1010. The transceiver 1008 receives and sends data through the antenna 1010.

When the communications apparatus 1000 is the first terminal device, the input interface circuit 1002 may be configured to obtain to-be-processed data, where the to-be-processed data may be, for example, first biometric information of a first user. The logic circuit 1004 is configured to perform the vehicle control method described above, and process the to-be-processed data (for example, the first biometric information of the first user), to obtain processed data, where the processed data may be, for example, to-be-verified first verification information. The output interface circuit 1006 is configured to output the processed data, for example, the first verification information.

When the communications apparatus 1000 is the in-vehicle device, the input interface circuit 1002 may be configured to obtain to-be-processed data, where the to-be-processed data may be, for example, first verification information. The logic circuit 1004 is configured to perform the vehicle control method described above, and process the to-be-processed data (for example, the first verification information), to obtain processed data, where the processed data may be, for example, a verification result of the first verification information. The output interface circuit 1006 is configured to output the processed data, for example, the verification result.

When the communications apparatus 1000 is the second terminal device, the input interface circuit 1002 may be configured to obtain to-be-processed data, where the to-be-processed data may be, for example, second biometric information of a second user and authorization information sent by a first terminal device. The logic circuit 1004 is configured to perform the vehicle control method described above, and process the to-be-processed data (for example, the second biometric information and the authorization information), to obtain processed data, where the processed data may be, for example, second verification information and third verification information. The output interface circuit 1006 is configured to output the processed data, for example, the second verification information and the third verification information.

In specific implementation, the communications apparatus 1000 may be a chip or an integrated circuit.

What is claimed is:

1. A vehicle control method, comprising:
   obtaining, by a first terminal device, first biometric information of a first user;
   generating, by the first terminal device, a first key based on the first biometric information and identifier information of the first terminal device;
   generating, by the first terminal device, first verification information based on the first key and first permission information, wherein the first permission information indicates a control permission of a vehicle, and the first permission information is permission information generated by the first terminal device for the first user to control the vehicle, wherein the generating, by the first terminal device, first verification information based on the first key and first permission information comprises:
      generating, by the first terminal device, a message authentication code based on the first key, the first permission information, and at least one of identifier information of the vehicle or random information generated by an in-vehicle device, and wherein the first verification information comprises the message authentication code; and
   sending, by the first terminal device, the first verification information and the first permission information to the in-vehicle device to control the vehicle to start.

2. The method according to claim 1, wherein the generating, by the first terminal device, a first key based on the first biometric information and identifier information of the first terminal device comprises:
   generating, by the first terminal device, a first-part key based on the first biometric information;
   generating, by the first terminal device, a second-part key based on the identifier information of the first terminal device; and
   generating, by the first terminal device, the first key based on the first-part key and the second-part key.

3. The method according to claim 1, wherein the method further comprises:
   before the obtaining, by the first terminal device, the first biometric information of the first user:
      obtaining, by the first terminal device, the first biometric information of the first user;
      generating, by the first terminal device, a digital vehicle key based on the first biometric information and the identifier information of the first terminal device;
      sending, by the first terminal device, the digital vehicle key to the in-vehicle device; and
      deleting, by the first terminal device, the first biometric information and the first key.

4. The method according to claim 1, wherein the method further comprises:
   obtaining, by the first terminal device, a second key from a second terminal device of a second user, wherein the second key is generated based on second biometric information of the second user and identifier information of the second terminal device;
   generating, by the first terminal device, authorization information based on the first key and the second key; and
   sending, by the first terminal device, the authorization information to the second terminal device, wherein the authorization information is used by the second terminal device to generate second verification information, and the second verification information is sent to the in-vehicle device to perform identity authentication on the second terminal device.

5. The method according to claim 4, wherein the second key is sent to the in-vehicle device.

6. The method according to claim 4, wherein the authorization information comprises a third key, and the third key is generated based on the first key and the second key; or
   the authorization information comprises signature information, the signature information is information obtained by signing at least one of second permission information and the second key based on the first key, the second permission information comprises the second key, and the second permission information is permission information that is used for the second user to control a vehicle and is generated by the first terminal device based on the second key after the first terminal device receives the second key from the second terminal device.

7. A vehicle control method, comprising:
   obtaining, by an in-vehicle device, first verification information and first permission information from a first terminal device, wherein the first verification information comprises a message authentication code that is generated based on a first key, the first permission information and at least one of identifier information of a vehicle or random information generated by the in-vehicle device, and the first key is generated based on first biometric information of a first user and identifier information of the first terminal device, and wherein the first permission information indicates a control permission of the vehicle, and the first permission information is permission information for the first user to control the vehicle;

verifying, by the in-vehicle device, the first verification information by using a preset digital vehicle key; and when the verification of the first verification information succeeds, controlling the vehicle to start, wherein the digital vehicle key is obtained based on the first biometric information of the first user and the identifier information of the first terminal device.

8. The method according to claim 7, wherein the method further comprises:

obtaining, by the in-vehicle device, second verification information and third verification information from a second terminal device of a second user, wherein the second verification information is generated based on authorization information that is received by the second terminal device from the first terminal device, the third verification information is generated based on a second key, and the second key is generated based on second biometric information of the second user and identifier information of the second terminal device;

verifying, by the in-vehicle device, the second verification information and the third verification information; and when the verification of the second and the third verification information succeeds, controlling the vehicle to start.

9. A vehicle control method, comprising:

obtaining, by a second terminal device, second biometric information of a second user;

generating, by the second terminal device, a second key based on the second biometric information and identifier information of the second terminal device;

sending, by the second terminal device, the second key to a first terminal device of a first user;

obtaining, by the second terminal device, authorization information from the first terminal device, wherein the authorization information is generated based on a first key and the second key, and the first key is generated based on first biometric information of the first user and identifier information of the first terminal device;

generating, by the second terminal device, second verification information based on the authorization information, and generating third verification information based on the second key; and sending, by the second terminal device, the second verification information and the third verification information to an in-vehicle device to control a vehicle to start.

10. The method according to claim 9, wherein the authorization information comprises a third key, and the third key is generated based on the first key and the second key.

11. The method according to claim 9, wherein the authorization information comprises signature information, the signature information is information obtained by signing at least one of second permission information and the second key based on the first key, the second permission information comprises the second key, and the second permission information is permission information that is used for the second user to control a vehicle and is generated by the first terminal device based on the second key after the first terminal device receives the second key from the second terminal device.

12. A vehicle control system, comprising a first terminal device and an in-vehicle device, wherein:

the first terminal device comprises:
at least one first processor; and
one or more first memories coupled to the at least one first processor and storing first programming instructions for execution by the at least one first processor to cause the first terminal device to:
obtain first biometric information of a first user;
generate a first key based on the first biometric information and identifier information of the first terminal device;
generate first verification information based on the first key and first permission information, wherein the first permission information indicates a control permission of a vehicle, and the first permission information is permission information generated by the first terminal device for the first user to control the vehicle, wherein the generate first verification information based on the first key and first permission information comprises: generate a message authentication code based on the first key, the first permission information, and at least one of identifier information of the vehicle or random information generated by the in-vehicle device, and wherein the first verification information comprises the message authentication code; and
send the first verification information and the first permission information to the in-vehicle device; and the in-vehicle device comprises:
at least one second processor; and
one or more second memories coupled to the at least one second processor and storing second programming instructions for execution by the at least one second processor to cause the in-vehicle device to:
verify the first verification information by using a preset digital vehicle key; and
when the verification of the first verification information succeeds, control the vehicle to start.

13. The vehicle control system according to claim 12, wherein the first programming instructions, when executed by the at least one first processor, cause the first terminal device to:
generate a first-part key based on the first biometric information;
generate a second-part key based on the identifier information of the first terminal device; and
generate the first key based on the first-part key and the second-part key.

14. The vehicle control system according to claim 12, further comprising a second terminal device, wherein:

the first programming instructions, when executed by the at least one first processor, cause the first terminal device to:
obtain a second key from a second terminal device of a second user, wherein the second key is generated based on second biometric information of the second user and identifier information of the second terminal device;
generate authorization information based on the first key and the second key; and
send the authorization information to the second terminal device;

the second terminal device comprises:
at least one third processor; and
one or more third memories coupled to the at least one third processor and storing third programming instructions for execution by the at least one third processor to cause the second terminal device to:
generate second verification information by using the authorization information; and
send the second verification information to the in-vehicle device; and
the second programming instructions, when executed by the at least one second processor, cause the in-vehicle device to:
perform identity authentication on the second terminal device based on the second verification information.

15. The vehicle control system according to claim 14, wherein
the first programming instructions, when executed by the at least one first processor, cause the first terminal device to: send the second key to the in-vehicle device; and
the second programming instructions, when executed by the at least one second processor, cause the in-vehicle device to: perform identity authentication on the second terminal device based on the digital vehicle key and the second key.

16. The vehicle control system according to claim 14, wherein the authorization information comprises a third key, and the third key is generated based on the first key and the second key; or
the authorization information comprises signature information, the signature information is information obtained by signing at least one of second permission information and the second key based on the first key, the second permission information comprises the second key, and the second permission information is permission information that is used for the second user to control a vehicle and is generated by the first terminal device based on the second key after the first terminal device receives the second key from the second terminal device.

17. The vehicle control system according to claim 14, wherein:
when the digital vehicle key is a symmetric key of the first key, the authorization information comprises a third key, and the third key is generated based on the first key and the second key; or
when the digital vehicle key is an asymmetric key of the first key, the authorization information comprises signature information, the signature information is information obtained by signing at least one of second permission information and the second key based on the first key, the second permission information comprises the second key, and the second permission information is permission information that is used for the second user to control the vehicle and is generated by the first terminal device based on the second key after the first terminal device receives the second key from the second terminal device.

18. The vehicle control system according to claim 12, wherein the first programming instructions, when executed by the at least one first processor, cause the first terminal device to:
obtain the first biometric information of the first user;
generate a digital vehicle key based on the first biometric information and the identifier information of the first terminal device;
send the digital vehicle key to the in-vehicle device; and
delete the first biometric information and the first key.

* * * * *